(12) United States Patent
Sommerlade et al.

(10) Patent No.: US 11,030,981 B2
(45) Date of Patent: Jun. 8, 2021

(54) INTELLIGENT PRIVACY SYSTEM, APPARATUS, AND METHOD THEREOF

(71) Applicant: RealD Spark, LLC, Beverly Hills, CA (US)

(72) Inventors: Eric Sommerlade, Oxford (GB); Graham J. Woodgate, Henley-on-Thames (GB); Helen Flynn, Oxford (GB)

(73) Assignee: RealD Spark, LLC, Beverly Hills, CA (US)

( * ) Notice: Subject to any disclaimer, the term of this patent is extended or adjusted under 35 U.S.C. 154(b) by 0 days.

(21) Appl. No.: 16/596,957

(22) Filed: Oct. 9, 2019

(65) Prior Publication Data

US 2020/0098342 A1 Mar. 26, 2020

Related U.S. Application Data

(63) Continuation of application No. 15/334,023, filed on Oct. 25, 2016, now Pat. No. 10,475,418.
(Continued)

(51) Int. Cl.
*G09G 5/38* (2006.01)
*G06F 21/84* (2013.01)
(Continued)

(52) U.S. Cl.
CPC .............. *G09G 5/38* (2013.01); *G06F 21/31* (2013.01); *G06F 21/554* (2013.01);
(Continued)

(58) Field of Classification Search
None
See application file for complete search history.

(56) References Cited

U.S. PATENT DOCUMENTS

| 1,128,979 A | 2/1915 | Hess |
| 1,970,311 A | 8/1934 | Ives |

(Continued)

FOREIGN PATENT DOCUMENTS

| CA | 2222313 A1 | 6/1998 |
| CN | 1142869 A | 2/1997 |

(Continued)

OTHER PUBLICATIONS

CN-201380026046.4 Chinese 1st Office Action of the State Intellectual Property Office of P.R. China dated Oct. 24, 2016.
(Continued)

*Primary Examiner* — James A Thompson
(74) *Attorney, Agent, or Firm* — Penny L. Lowry

(57) ABSTRACT

A directional display apparatus including a directional display device that is capable of directing a displayed image into a viewing window of variable width is provided with a privacy control function. A control system detects the presence of one or more secondary viewers in addition to a primary viewer, and decides whether the one or more secondary viewers is permitted to view the displayed image. The control system directs a displayed image into a viewing window which is adjusted, for example by decreasing the width, in dependence on that detection. In addition, the control system detects relative movement between the primary viewer and the display device, and the width of the viewing window is increased in response to detection of said relative movement.

16 Claims, 5 Drawing Sheets

Related U.S. Application Data

(60) Provisional application No. 62/246,584, filed on Oct. 26, 2015, provisional application No. 62/261,151, filed on Nov. 30, 2015.

(51) Int. Cl.

| | | |
|---|---|---|
| *G06F 21/55* | (2013.01) | |
| *G06F 21/62* | (2013.01) | |
| *H04W 12/06* | (2021.01) | |
| *G06F 21/31* | (2013.01) | |
| *G06K 9/00* | (2006.01) | |
| *G09G 5/14* | (2006.01) | |
| *H04N 13/30* | (2018.01) | |
| *H04L 29/06* | (2006.01) | |
| *H04W 12/47* | (2021.01) | |
| *H04N 13/00* | (2018.01) | |

(52) U.S. Cl.
CPC .......... *G06F 21/6245* (2013.01); *G06F 21/84* (2013.01); *G06K 9/00369* (2013.01); *G09G 5/14* (2013.01); *H04L 63/0861* (2013.01); *H04L 63/107* (2013.01); *H04W 12/06* (2013.01); *H04W 12/47* (2021.01); *G06F 2221/032* (2013.01); *G06F 2221/2111* (2013.01); *G06F 2221/2149* (2013.01); *G09G 2340/0464* (2013.01); *G09G 2354/00* (2013.01); *G09G 2358/00* (2013.01); *H04N 2013/0081* (2013.01); *H04N 2013/40* (2018.05)

(56) References Cited

U.S. PATENT DOCUMENTS

| | | |
|---|---|---|
| 2,133,121 A | 10/1938 | Stearns |
| 2,247,969 A | 7/1941 | Lemuel |
| 2,480,178 A | 8/1949 | Zinberg |
| 2,810,905 A | 10/1957 | Barlow |
| 3,409,351 A | 11/1968 | Winnek |
| 3,715,154 A | 2/1973 | Bestenreiner |
| 4,057,323 A | 11/1977 | Ward |
| 4,528,617 A | 7/1985 | Blackington |
| 4,542,958 A | 9/1985 | Young |
| 4,621,898 A | 11/1986 | Cohen |
| 4,804,253 A | 2/1989 | Stewart |
| 4,807,978 A | 2/1989 | Grinberg et al. |
| 4,829,365 A | 5/1989 | Eichenlaub |
| 4,914,553 A | 4/1990 | Hamada et al. |
| 4,974,941 A | 12/1990 | Gibbons et al. |
| 5,005,108 A | 4/1991 | Pristash et al. |
| 5,035,491 A | 7/1991 | Kawagishi et al. |
| 5,278,608 A | 1/1994 | Taylor et al. |
| 5,347,644 A | 9/1994 | Sedlmayr |
| 5,349,419 A | 9/1994 | Taguchi et al. |
| 5,459,592 A | 10/1995 | Shibatani et al. |
| 5,466,926 A | 11/1995 | Sasano et al. |
| 5,510,831 A | 4/1996 | Mayhew |
| 5,528,720 A | 6/1996 | Winston et al. |
| 5,581,402 A | 12/1996 | Taylor |
| 5,588,526 A | 12/1996 | Fantone et al. |
| 5,658,490 A | 8/1997 | Sharp et al. |
| 5,697,006 A | 12/1997 | Taguchi et al. |
| 5,703,667 A | 12/1997 | Ochiai |
| 5,715,028 A | 2/1998 | Abileah et al. |
| 5,727,107 A | 3/1998 | Umemoto et al. |
| 5,771,066 A | 6/1998 | Barnea |
| 5,796,451 A | 8/1998 | Kim |
| 5,808,784 A | 9/1998 | Ando et al. |
| 5,808,792 A | 9/1998 | Woodgate et al. |
| 5,835,166 A | 11/1998 | Hall et al. |
| 5,850,580 A | 12/1998 | Taguchi et al. |
| 5,875,055 A | 2/1999 | Morishima et al. |
| 5,894,361 A | 4/1999 | Yamazaki et al. |
| 5,896,225 A | 4/1999 | Chikazawa |
| 5,903,388 A | 5/1999 | Sedlmayr |
| 5,933,276 A | 8/1999 | Magee |
| 5,956,001 A | 9/1999 | Sumida et al. |
| 5,959,664 A | 9/1999 | Woodgate |
| 5,959,702 A | 9/1999 | Goodman |
| 5,969,850 A | 10/1999 | Harrold et al. |
| 5,971,559 A | 10/1999 | Ishikawa et al. |
| 6,008,484 A | 12/1999 | Woodgate et al. |
| 6,014,164 A | 1/2000 | Woodgate et al. |
| 6,023,315 A | 2/2000 | Harrold et al. |
| 6,044,196 A | 3/2000 | Winston et al. |
| 6,055,013 A | 4/2000 | Woodgate et al. |
| 6,055,103 A | 4/2000 | Woodgate et al. |
| 6,061,179 A | 5/2000 | Inoguchi et al. |
| 6,061,489 A | 5/2000 | Ezra et al. |
| 6,064,424 A | 5/2000 | Berkel et al. |
| 6,075,557 A | 6/2000 | Holliman et al. |
| 6,094,216 A | 7/2000 | Taniguchi et al. |
| 6,099,758 A | 8/2000 | Verrall et al. |
| 6,108,059 A | 8/2000 | Yang |
| 6,118,584 A | 9/2000 | Berkel et al. |
| 6,128,054 A | 10/2000 | Schwarzenberger |
| 6,144,118 A | 11/2000 | Cahill et al. |
| 6,144,433 A | 11/2000 | Tillin et al. |
| 6,172,723 B1 | 1/2001 | Inoue et al. |
| 6,199,995 B1 | 3/2001 | Umemoto et al. |
| 6,204,904 B1 | 3/2001 | Tillin et al. |
| 6,219,113 B1 | 4/2001 | Takahara |
| 6,222,672 B1 | 4/2001 | Towler et al. |
| 6,224,214 B1 | 5/2001 | Martin et al. |
| 6,232,592 B1 | 5/2001 | Sugiyama |
| 6,256,447 B1 | 7/2001 | Laine |
| 6,262,786 B1 | 7/2001 | Perlo et al. |
| 6,295,109 B1 | 9/2001 | Kubo et al. |
| 6,302,541 B1 | 10/2001 | Grossmann |
| 6,305,813 B1 | 10/2001 | Lekson et al. |
| 6,335,999 B1 | 1/2002 | Winston et al. |
| 6,373,637 B1 | 4/2002 | Gulick et al. |
| 6,377,295 B1 | 4/2002 | Woodgate et al. |
| 6,392,727 B1 | 5/2002 | Larson et al. |
| 6,422,713 B1 | 7/2002 | Fohl et al. |
| 6,437,915 B2 | 8/2002 | Moseley et al. |
| 6,456,340 B1 | 9/2002 | Margulis |
| 6,464,365 B1 | 10/2002 | Gunn et al. |
| 6,476,850 B1 | 11/2002 | Erbey |
| 6,481,849 B2 | 11/2002 | Martin et al. |
| 6,654,156 B1 | 11/2003 | Crossland et al. |
| 6,663,254 B2 | 12/2003 | Ohsumi |
| 6,724,452 B1 | 4/2004 | Takeda et al. |
| 6,731,355 B2 | 5/2004 | Miyashita |
| 6,736,512 B2 | 5/2004 | Balogh |
| 6,801,243 B1 | 10/2004 | Berkel |
| 6,816,158 B1 | 11/2004 | Lemelson et al. |
| 6,825,985 B2 | 11/2004 | Brown et al. |
| 6,847,354 B2 | 1/2005 | Vranish |
| 6,847,488 B2 | 1/2005 | Travis |
| 6,859,240 B1 | 2/2005 | Brown et al. |
| 6,867,828 B2 | 3/2005 | Taira et al. |
| 6,870,671 B2 | 3/2005 | Travis |
| 6,883,919 B2 | 4/2005 | Travis |
| 7,052,168 B2 | 5/2006 | Epstein et al. |
| 7,058,252 B2 | 6/2006 | Woodgate et al. |
| 7,067,985 B2 | 6/2006 | Adachi |
| 7,073,933 B2 | 7/2006 | Gotoh et al. |
| 7,091,931 B2 | 8/2006 | Yoon |
| 7,101,048 B2 | 9/2006 | Travis |
| 7,136,031 B2 | 11/2006 | Lee et al. |
| 7,163,319 B2 | 1/2007 | Kuo et al. |
| 7,215,391 B2 | 5/2007 | Kuan et al. |
| 7,215,415 B2 | 5/2007 | Maehara et al. |
| 7,215,475 B2 | 5/2007 | Woodgate et al. |
| 7,227,602 B2 | 6/2007 | Jeon et al. |
| 7,239,293 B2 | 7/2007 | Perlin et al. |
| 7,365,908 B2 | 4/2008 | Dolgoff |
| 7,375,886 B2 | 5/2008 | Lipton et al. |
| 7,410,286 B2 | 8/2008 | Travis |
| 7,430,358 B2 | 9/2008 | Qi et al. |
| 7,492,346 B2 | 2/2009 | Manabe et al. |

(56) References Cited

U.S. PATENT DOCUMENTS

| | | |
|---|---|---|
| 7,524,542 B2 | 4/2009 | Kim et al. |
| 7,528,893 B2 | 5/2009 | Schultz et al. |
| 7,528,913 B2 | 5/2009 | Kobayashi |
| 7,545,429 B2 | 6/2009 | Travis |
| 7,587,117 B2 | 9/2009 | Winston et al. |
| 7,614,777 B2 | 11/2009 | Koganezawa et al. |
| 7,633,586 B2 | 12/2009 | Winlow et al. |
| 7,660,047 B1 | 2/2010 | Travis et al. |
| 7,750,981 B2 | 7/2010 | Shestak et al. |
| 7,750,982 B2 | 7/2010 | Nelson et al. |
| 7,766,534 B2 | 8/2010 | Iwasaki |
| 7,771,102 B2 | 8/2010 | Iwasaki |
| 7,834,834 B2 | 11/2010 | Takatani et al. |
| 7,944,428 B2 | 5/2011 | Travis |
| 7,970,246 B2 | 6/2011 | Travis et al. |
| 7,976,208 B2 | 7/2011 | Travis |
| 7,991,257 B1 | 8/2011 | Coleman |
| 8,016,475 B2 | 9/2011 | Travis |
| 8,098,350 B2 | 1/2012 | Sakai et al. |
| 8,154,686 B2 | 4/2012 | Mather et al. |
| 8,216,405 B2 | 7/2012 | Emerton et al. |
| 8,223,296 B2 | 7/2012 | Lee et al. |
| 8,237,876 B2 | 8/2012 | Tan et al. |
| 8,249,408 B2 | 8/2012 | Coleman |
| 8,251,562 B2 | 8/2012 | Kuramitsu et al. |
| 8,262,271 B2 | 9/2012 | Tillin et al. |
| 8,325,295 B2 | 12/2012 | Sugita et al. |
| 8,354,806 B2 | 1/2013 | Travis et al. |
| 8,477,261 B2 | 7/2013 | Travis et al. |
| 8,502,253 B2 | 8/2013 | Min |
| 8,534,901 B2 | 9/2013 | Panagotacos et al. |
| 8,556,491 B2 | 10/2013 | Lee |
| 8,646,931 B2 | 2/2014 | Choi et al. |
| 8,651,725 B2 | 2/2014 | Ie et al. |
| 8,714,804 B2 | 5/2014 | Kim et al. |
| 8,752,995 B2 | 6/2014 | Park |
| 8,801,260 B2 | 8/2014 | Urano et al. |
| 8,939,595 B2 | 1/2015 | Choi et al. |
| 8,973,149 B2 | 3/2015 | Buck |
| 9,195,087 B2 | 11/2015 | Terashima |
| 9,197,884 B2 | 11/2015 | Lee et al. |
| 9,274,260 B2 | 3/2016 | Urano et al. |
| 9,304,241 B2 | 4/2016 | Wang et al. |
| 9,324,234 B2 | 4/2016 | Ricci et al. |
| 9,448,355 B2 | 9/2016 | Urano et al. |
| 9,501,036 B2 | 11/2016 | Kang et al. |
| 9,519,153 B2 | 12/2016 | Robinson et al. |
| 10,054,732 B2 | 8/2018 | Robinson et al. |
| 10,126,575 B1 | 11/2018 | Robinson et al. |
| 10,228,505 B2 | 3/2019 | Robinson et al. |
| 10,303,030 B2 | 5/2019 | Robinson et al. |
| 10,401,638 B2 | 9/2019 | Robinson et al. |
| 10,488,705 B2 | 11/2019 | Xu et al. |
| 10,649,248 B1 | 5/2020 | Jiang et al. |
| 10,649,259 B2 | 5/2020 | Lee et al. |
| 2001/0001566 A1 | 5/2001 | Moseley et al. |
| 2001/0050686 A1 | 12/2001 | Allen |
| 2002/0018299 A1 | 2/2002 | Daniell |
| 2002/0024529 A1 | 2/2002 | Miller et al. |
| 2002/0113246 A1 | 8/2002 | Nagai et al. |
| 2002/0113866 A1 | 8/2002 | Taniguchi et al. |
| 2002/0171793 A1 | 11/2002 | Sharp et al. |
| 2003/0046839 A1 | 3/2003 | Oda et al. |
| 2003/0089956 A1 | 5/2003 | Allen et al. |
| 2003/0107686 A1 | 6/2003 | Sato et al. |
| 2003/0117790 A1 | 6/2003 | Lee et al. |
| 2003/0133191 A1 | 7/2003 | Morita et al. |
| 2003/0137738 A1 | 7/2003 | Ozawa et al. |
| 2003/0137821 A1 | 7/2003 | Gotoh et al. |
| 2004/0008877 A1 | 1/2004 | Leppard et al. |
| 2004/0015729 A1 | 1/2004 | Elms et al. |
| 2004/0021809 A1 | 2/2004 | Sumiyoshi et al. |
| 2004/0042233 A1 | 3/2004 | Suzuki et al. |
| 2004/0046709 A1 | 3/2004 | Yoshino |
| 2004/0100598 A1 | 5/2004 | Adachi et al. |
| 2004/0105264 A1 | 6/2004 | Spero |
| 2004/0108971 A1 | 6/2004 | Waldern et al. |
| 2004/0109303 A1 | 6/2004 | Olczak |
| 2004/0125430 A1 | 7/2004 | Kasajima et al. |
| 2004/0135741 A1 | 7/2004 | Tomisawa et al. |
| 2004/0145703 A1 | 7/2004 | O'Connor et al. |
| 2004/0170011 A1 | 9/2004 | Kim et al. |
| 2004/0240777 A1 | 12/2004 | Woodgate et al. |
| 2004/0263968 A1 | 12/2004 | Kobayashi et al. |
| 2004/0263969 A1 | 12/2004 | Lipton et al. |
| 2005/0007753 A1 | 1/2005 | Hees et al. |
| 2005/0094295 A1 | 5/2005 | Yamashita et al. |
| 2005/0110980 A1 | 5/2005 | Maehara et al. |
| 2005/0111100 A1 | 5/2005 | Mather et al. |
| 2005/0117186 A1 | 6/2005 | Li et al. |
| 2005/0135116 A1 | 6/2005 | Epstein et al. |
| 2005/0157225 A1 | 7/2005 | Toyooka et al. |
| 2005/0174768 A1 | 8/2005 | Conner |
| 2005/0180167 A1 | 8/2005 | Hoelen et al. |
| 2005/0190326 A1 | 9/2005 | Jeon et al. |
| 2005/0190329 A1 | 9/2005 | Okumura |
| 2005/0190345 A1 | 9/2005 | Dubin et al. |
| 2005/0219693 A1 | 10/2005 | Hartkop et al. |
| 2005/0237488 A1 | 10/2005 | Yamasaki et al. |
| 2005/0254127 A1 | 11/2005 | Evans et al. |
| 2005/0264717 A1 | 12/2005 | Chien et al. |
| 2005/0274956 A1 | 12/2005 | Bhat |
| 2005/0276071 A1 | 12/2005 | Sasagawa et al. |
| 2005/0280637 A1 | 12/2005 | Ikeda et al. |
| 2006/0012845 A1 | 1/2006 | Edwards |
| 2006/0056166 A1 | 3/2006 | Yeo et al. |
| 2006/0082702 A1 | 4/2006 | Jacobs et al. |
| 2006/0114664 A1 | 6/2006 | Sakata et al. |
| 2006/0132423 A1 | 6/2006 | Travis |
| 2006/0139447 A1 | 6/2006 | Unkrich |
| 2006/0158729 A1 | 7/2006 | Vissenberg et al. |
| 2006/0176912 A1 | 8/2006 | Anikitchev |
| 2006/0203162 A1 | 9/2006 | Ito et al. |
| 2006/0203200 A1 | 9/2006 | Koide |
| 2006/0215129 A1 | 9/2006 | Alasaarela et al. |
| 2006/0215244 A1 | 9/2006 | Yosha et al. |
| 2006/0221642 A1 | 10/2006 | Daiku |
| 2006/0227427 A1 | 10/2006 | Dolgoff |
| 2006/0244884 A1 | 11/2006 | Jeon et al. |
| 2006/0244918 A1 | 11/2006 | Cossairt et al. |
| 2006/0250580 A1 | 11/2006 | Silverstein et al. |
| 2006/0262258 A1 | 11/2006 | Wang et al. |
| 2006/0262376 A1 | 11/2006 | Mather et al. |
| 2006/0262558 A1 | 11/2006 | Cornelissen |
| 2006/0268207 A1 | 11/2006 | Tan et al. |
| 2006/0269213 A1 | 11/2006 | Hwang et al. |
| 2006/0284974 A1 | 12/2006 | Lipton et al. |
| 2006/0285040 A1 | 12/2006 | Kobayashi |
| 2006/0291053 A1 | 12/2006 | Robinson et al. |
| 2006/0291243 A1 | 12/2006 | Niioka et al. |
| 2007/0008406 A1 | 1/2007 | Shestak et al. |
| 2007/0013624 A1 | 1/2007 | Bourhill |
| 2007/0025680 A1 | 2/2007 | Winston et al. |
| 2007/0035706 A1 | 2/2007 | Margulis |
| 2007/0035829 A1 | 2/2007 | Woodgate et al. |
| 2007/0035964 A1 | 2/2007 | Olczak |
| 2007/0047254 A1 | 3/2007 | Schardt et al. |
| 2007/0064163 A1 | 3/2007 | Tan et al. |
| 2007/0081110 A1 | 4/2007 | Lee |
| 2007/0085105 A1 | 4/2007 | Beeson et al. |
| 2007/0109401 A1 | 5/2007 | Lipton et al. |
| 2007/0115551 A1 | 5/2007 | Spilman et al. |
| 2007/0115552 A1 | 5/2007 | Robinson et al. |
| 2007/0139772 A1 | 6/2007 | Wang |
| 2007/0153160 A1 | 7/2007 | Lee et al. |
| 2007/0183466 A1 | 8/2007 | Son et al. |
| 2007/0188667 A1 | 8/2007 | Schwerdtner |
| 2007/0189701 A1 | 8/2007 | Chakmakjian et al. |
| 2007/0223251 A1 | 9/2007 | Liao |
| 2007/0223252 A1 | 9/2007 | Lee et al. |
| 2007/0285775 A1 | 12/2007 | Lesage et al. |
| 2008/0068329 A1 | 3/2008 | Shestak et al. |
| 2008/0079662 A1 | 4/2008 | Saishu et al. |
| 2008/0084519 A1 | 4/2008 | Brigham et al. |

(56) References Cited

U.S. PATENT DOCUMENTS

| | | |
|---|---|---|
| 2008/0086289 A1 | 4/2008 | Brott |
| 2008/0128728 A1 | 6/2008 | Nemchuk et al. |
| 2008/0158491 A1 | 7/2008 | Zhu et al. |
| 2008/0225205 A1 | 9/2008 | Travis |
| 2008/0259012 A1 | 10/2008 | Fergason |
| 2008/0285310 A1 | 11/2008 | Aylward et al. |
| 2008/0291359 A1 | 11/2008 | Miyashita |
| 2008/0297431 A1 | 12/2008 | Yuuki et al. |
| 2008/0297459 A1 | 12/2008 | Sugimoto et al. |
| 2008/0304282 A1 | 12/2008 | Mi et al. |
| 2008/0316198 A1 | 12/2008 | Fukushima et al. |
| 2008/0316768 A1 | 12/2008 | Travis |
| 2009/0014700 A1 | 1/2009 | Metcalf et al. |
| 2009/0016057 A1 | 1/2009 | Rinko |
| 2009/0040426 A1 | 2/2009 | Mather et al. |
| 2009/0067156 A1 | 3/2009 | Bonnett et al. |
| 2009/0085894 A1 | 4/2009 | Gandhi et al. |
| 2009/0086509 A1 | 4/2009 | Omori et al. |
| 2009/0128735 A1 | 5/2009 | Larson et al. |
| 2009/0128746 A1 | 5/2009 | Kean et al. |
| 2009/0135623 A1 | 5/2009 | Kunimochi |
| 2009/0140656 A1 | 6/2009 | Kohashikawa et al. |
| 2009/0160757 A1 | 6/2009 | Robinson |
| 2009/0167651 A1 | 7/2009 | Benitez et al. |
| 2009/0174700 A1 | 7/2009 | Daiku |
| 2009/0174843 A1 | 7/2009 | Sakai et al. |
| 2009/0190072 A1 | 7/2009 | Nagata et al. |
| 2009/0190079 A1 | 7/2009 | Saitoh |
| 2009/0213298 A1 | 8/2009 | Mimura et al. |
| 2009/0213305 A1 | 8/2009 | Ohmuro et al. |
| 2009/0225380 A1 | 9/2009 | Schwerdtner et al. |
| 2009/0244415 A1 | 10/2009 | Ide |
| 2009/0278936 A1 | 11/2009 | Pastoor et al. |
| 2009/0290203 A1 | 11/2009 | Schwerdtner |
| 2010/0002296 A1 | 1/2010 | Choi et al. |
| 2010/0034987 A1 | 2/2010 | Fujii et al. |
| 2010/0040280 A1 | 2/2010 | McKnight |
| 2010/0053771 A1 | 3/2010 | Travis et al. |
| 2010/0091093 A1 | 4/2010 | Robinson |
| 2010/0091254 A1 | 4/2010 | Travis et al. |
| 2010/0128200 A1 | 5/2010 | Morishita et al. |
| 2010/0149459 A1 | 6/2010 | Yabuta et al. |
| 2010/0165598 A1 | 7/2010 | Chen et al. |
| 2010/0177113 A1 | 7/2010 | Gay et al. |
| 2010/0177387 A1 | 7/2010 | Travis et al. |
| 2010/0182542 A1 | 7/2010 | Nakamoto et al. |
| 2010/0188438 A1 | 7/2010 | Kang |
| 2010/0188602 A1 | 7/2010 | Feng |
| 2010/0205667 A1 | 8/2010 | Anderson et al. |
| 2010/0214135 A1 | 8/2010 | Bathiche et al. |
| 2010/0220260 A1 | 9/2010 | Sugita et al. |
| 2010/0231498 A1 | 9/2010 | Large et al. |
| 2010/0238376 A1 | 9/2010 | Sakai et al. |
| 2010/0277575 A1 | 11/2010 | Ismael et al. |
| 2010/0278480 A1 | 11/2010 | Vasylyev |
| 2010/0283930 A1 | 11/2010 | Park et al. |
| 2010/0289870 A1 | 11/2010 | Leister |
| 2010/0289989 A1 | 11/2010 | Adachi et al. |
| 2010/0295755 A1 | 11/2010 | Broughton et al. |
| 2010/0295920 A1 | 11/2010 | McGowan |
| 2010/0295930 A1 | 11/2010 | Ezhov |
| 2010/0300608 A1 | 12/2010 | Emerton et al. |
| 2010/0302135 A1 | 12/2010 | Larson et al. |
| 2010/0309296 A1 | 12/2010 | Harrold et al. |
| 2010/0321953 A1 | 12/2010 | Coleman et al. |
| 2010/0328438 A1 | 12/2010 | Ohyama et al. |
| 2011/0013417 A1 | 1/2011 | Saccomanno et al. |
| 2011/0018860 A1 | 1/2011 | Parry-Jones et al. |
| 2011/0019112 A1 | 1/2011 | Dolgoff |
| 2011/0032483 A1 | 2/2011 | Hruska et al. |
| 2011/0032724 A1 | 2/2011 | Kinoshita |
| 2011/0043142 A1 | 2/2011 | Travis et al. |
| 2011/0043501 A1 | 2/2011 | Daniel |
| 2011/0044056 A1 | 2/2011 | Travis et al. |
| 2011/0044579 A1 | 2/2011 | Travis et al. |
| 2011/0051237 A1 | 3/2011 | Hasegawa et al. |
| 2011/0187293 A1 | 8/2011 | Travis |
| 2011/0187635 A1 | 8/2011 | Lee et al. |
| 2011/0188120 A1 | 8/2011 | Tabirian et al. |
| 2011/0216266 A1 | 9/2011 | Travis |
| 2011/0221998 A1 | 9/2011 | Adachi et al. |
| 2011/0228183 A1 | 9/2011 | Hamagishi |
| 2011/0235359 A1 | 9/2011 | Liu et al. |
| 2011/0241983 A1 | 10/2011 | Chang |
| 2011/0242150 A1 | 10/2011 | Song et al. |
| 2011/0242277 A1 | 10/2011 | Do et al. |
| 2011/0242298 A1 | 10/2011 | Bathiche et al. |
| 2011/0255303 A1 | 10/2011 | Nichol et al. |
| 2011/0285927 A1 | 11/2011 | Schultz et al. |
| 2011/0286222 A1 | 11/2011 | Coleman |
| 2011/0292321 A1 | 12/2011 | Travis et al. |
| 2011/0310232 A1 | 12/2011 | Wilson et al. |
| 2011/0321143 A1* | 12/2011 | Angaluri ............. H04N 9/3194 726/6 |
| 2012/0002121 A1 | 1/2012 | Pirs et al. |
| 2012/0002136 A1 | 1/2012 | Nagata et al. |
| 2012/0002295 A1 | 1/2012 | Dobschal et al. |
| 2012/0008067 A1 | 1/2012 | Mun et al. |
| 2012/0013720 A1 | 1/2012 | Kadowaki et al. |
| 2012/0062991 A1 | 3/2012 | Mich et al. |
| 2012/0063166 A1 | 3/2012 | Panagotacos et al. |
| 2012/0075285 A1 | 3/2012 | Oyagi et al. |
| 2012/0081920 A1 | 4/2012 | Ie et al. |
| 2012/0086776 A1 | 4/2012 | Lo |
| 2012/0086875 A1 | 4/2012 | Yokota |
| 2012/0106193 A1 | 5/2012 | Kim et al. |
| 2012/0127573 A1 | 5/2012 | Robinson et al. |
| 2012/0147280 A1 | 6/2012 | Osterman et al. |
| 2012/0154450 A1 | 6/2012 | Aho et al. |
| 2012/0162966 A1 | 6/2012 | Kim et al. |
| 2012/0169838 A1 | 7/2012 | Sekine |
| 2012/0206050 A1 | 8/2012 | Spero |
| 2012/0235891 A1 | 9/2012 | Nishitani et al. |
| 2012/0236484 A1 | 9/2012 | Miyake |
| 2012/0243204 A1 | 9/2012 | Robinson |
| 2012/0243261 A1 | 9/2012 | Yamamoto et al. |
| 2012/0293721 A1 | 11/2012 | Ueyama |
| 2012/0294037 A1 | 11/2012 | Holman et al. |
| 2012/0299913 A1 | 11/2012 | Robinson et al. |
| 2012/0314145 A1 | 12/2012 | Robinson |
| 2012/0327101 A1 | 12/2012 | Blixt et al. |
| 2013/0039062 A1 | 2/2013 | Vinther et al. |
| 2013/0100097 A1 | 4/2013 | Martin |
| 2013/0101253 A1 | 4/2013 | Popovich et al. |
| 2013/0107174 A1 | 5/2013 | Yun et al. |
| 2013/0107340 A1 | 5/2013 | Wong et al. |
| 2013/0128165 A1 | 5/2013 | Lee et al. |
| 2013/0135588 A1 | 5/2013 | Popovich et al. |
| 2013/0169701 A1 | 7/2013 | Whitehead et al. |
| 2013/0242231 A1 | 9/2013 | Kurata et al. |
| 2013/0278544 A1 | 10/2013 | Cok |
| 2013/0293793 A1 | 11/2013 | Lu |
| 2013/0294113 A1 | 11/2013 | Lipton et al. |
| 2013/0300985 A1 | 11/2013 | Bulda |
| 2013/0307831 A1* | 11/2013 | Robinson ............. G02B 6/0068 345/207 |
| 2013/0307946 A1 | 11/2013 | Robinson et al. |
| 2013/0321340 A1 | 12/2013 | Seo et al. |
| 2013/0321599 A1 | 12/2013 | Harrold et al. |
| 2013/0328866 A1 | 12/2013 | Woodgate et al. |
| 2013/0335821 A1 | 12/2013 | Robinson et al. |
| 2014/0009508 A1 | 1/2014 | Woodgate et al. |
| 2014/0022619 A1 | 1/2014 | Woodgate et al. |
| 2014/0036361 A1 | 2/2014 | Woodgate et al. |
| 2014/0071382 A1 | 3/2014 | Scardato |
| 2014/0098418 A1 | 4/2014 | Lin |
| 2014/0111760 A1 | 4/2014 | Guo et al. |
| 2014/0126238 A1 | 5/2014 | Kao et al. |
| 2014/0132887 A1 | 5/2014 | Kurata |
| 2014/0201844 A1 | 7/2014 | Buck |
| 2014/0211125 A1 | 7/2014 | Kurata |
| 2014/0232960 A1 | 8/2014 | Schwartz et al. |
| 2014/0240344 A1 | 8/2014 | Tomono et al. |
| 2014/0240828 A1 | 8/2014 | Robinson et al. |

(56) References Cited

U.S. PATENT DOCUMENTS

| | | |
|---|---|---|
| 2014/0268358 A1 | 9/2014 | Kusaka et al. |
| 2014/0286043 A1 | 9/2014 | Sykora et al. |
| 2014/0289835 A1 | 9/2014 | Varshaysky et al. |
| 2014/0340728 A1 | 11/2014 | Taheri |
| 2014/0361990 A1 | 12/2014 | Leister |
| 2014/0368602 A1 | 12/2014 | Woodgate et al. |
| 2015/0055366 A1 | 2/2015 | Chang et al. |
| 2015/0116212 A1* | 4/2015 | Freed .............. G06F 1/1686 345/156 |
| 2015/0177447 A1 | 6/2015 | Woodgate et al. |
| 2015/0177563 A1 | 6/2015 | Cho et al. |
| 2015/0185398 A1 | 7/2015 | Chang et al. |
| 2015/0205157 A1 | 7/2015 | Sakai et al. |
| 2015/0268479 A1 | 9/2015 | Woodgate et al. |
| 2015/0286061 A1 | 10/2015 | Seo et al. |
| 2015/0286817 A1 | 10/2015 | Haddad et al. |
| 2015/0301400 A1 | 10/2015 | Kimura et al. |
| 2015/0346417 A1 | 12/2015 | Powell |
| 2015/0346532 A1 | 12/2015 | Do et al. |
| 2015/0378085 A1 | 12/2015 | Robinson et al. |
| 2016/0103264 A1 | 4/2016 | Lee et al. |
| 2016/0132721 A1* | 5/2016 | Bostick ............ G06F 21/60 382/118 |
| 2016/0147074 A1 | 5/2016 | Kobayashi et al. |
| 2016/0154259 A1 | 6/2016 | Kim et al. |
| 2016/0216420 A1 | 7/2016 | Gaides et al. |
| 2016/0216540 A1 | 7/2016 | Cho et al. |
| 2016/0224106 A1* | 8/2016 | Liu .............. G06F 3/013 |
| 2016/0238869 A1 | 8/2016 | Osterman et al. |
| 2016/0334898 A1 | 11/2016 | Kwak et al. |
| 2016/0349444 A1 | 12/2016 | Robinson et al. |
| 2016/0356943 A1 | 12/2016 | Choi et al. |
| 2016/0357046 A1 | 12/2016 | Choi et al. |
| 2017/0003436 A1 | 1/2017 | Inoue et al. |
| 2017/0031206 A1 | 2/2017 | Smith et al. |
| 2017/0090103 A1 | 3/2017 | Holman |
| 2017/0092187 A1 | 3/2017 | Bergquist |
| 2017/0092229 A1 | 3/2017 | Greenebaum et al. |
| 2017/0115485 A1 | 4/2017 | Saito et al. |
| 2017/0123241 A1 | 5/2017 | Su et al. |
| 2017/0139110 A1 | 5/2017 | Woodgate et al. |
| 2017/0168633 A1 | 6/2017 | Kwak et al. |
| 2017/0205558 A1 | 7/2017 | Hirayama et al. |
| 2017/0236494 A1 | 8/2017 | Sommerlade et al. |
| 2017/0269283 A1 | 9/2017 | Wang et al. |
| 2017/0269285 A1 | 9/2017 | Hirayama et al. |
| 2017/0329399 A1* | 11/2017 | Azam .............. G06F 1/3265 |
| 2017/0336661 A1 | 11/2017 | Harrold et al. |
| 2017/0339398 A1 | 11/2017 | Woodgate et al. |
| 2017/0343715 A1 | 11/2017 | Fang et al. |
| 2018/0014007 A1 | 1/2018 | Brown |
| 2018/0052346 A1 | 2/2018 | Sakai et al. |
| 2018/0082068 A1 | 3/2018 | Lancioni et al. |
| 2018/0095581 A1 | 4/2018 | Hwang et al. |
| 2018/0113334 A1 | 4/2018 | Fang et al. |
| 2018/0188576 A1 | 7/2018 | Xu et al. |
| 2018/0188603 A1 | 7/2018 | Fang et al. |
| 2018/0196275 A1 | 7/2018 | Robinson et al. |
| 2018/0210243 A1 | 7/2018 | Fang et al. |
| 2018/0231811 A1 | 8/2018 | Wu |
| 2018/0252949 A1 | 9/2018 | Klippstein et al. |
| 2018/0259799 A1 | 9/2018 | Kroon |
| 2018/0259812 A1 | 9/2018 | Goda et al. |
| 2018/0321523 A1 | 11/2018 | Robinson et al. |
| 2018/0321553 A1 | 11/2018 | Robinson et al. |
| 2018/0329245 A1 | 11/2018 | Robinson et al. |
| 2018/0364526 A1 | 12/2018 | Finnemeyer et al. |
| 2019/0086706 A1 | 3/2019 | Robinson et al. |
| 2019/0121173 A1 | 4/2019 | Robinson et al. |
| 2019/0154896 A1 | 5/2019 | Yanai |
| 2019/0196236 A1 | 6/2019 | Chen et al. |
| 2019/0197928 A1 | 6/2019 | Schubert et al. |
| 2019/0215509 A1 | 7/2019 | Woodgate et al. |
| 2019/0227366 A1 | 7/2019 | Harrold et al. |
| 2019/0235304 A1 | 8/2019 | Tamada et al. |
| 2019/0250458 A1 | 8/2019 | Robinson et al. |
| 2019/0293858 A1 | 9/2019 | Woodgate et al. |
| 2019/0293983 A1 | 9/2019 | Robinson et al. |
| 2019/0353944 A1 | 11/2019 | Acreman et al. |
| 2020/0159055 A1 | 5/2020 | Robinson et al. |
| 2020/0225402 A1 | 7/2020 | Ihas et al. |

FOREIGN PATENT DOCUMENTS

| | | |
|---|---|---|
| CN | 1377453 A | 10/2002 |
| CN | 1454329 A | 11/2003 |
| CN | 1466005 A | 1/2004 |
| CN | 1487332 A | 4/2004 |
| CN | 1696788 A | 11/2005 |
| CN | 1823292 A | 8/2006 |
| CN | 1826553 A | 8/2006 |
| CN | 1866112 A | 11/2006 |
| CN | 2872404 | 2/2007 |
| CN | 1307481 | 3/2007 |
| CN | 101029975 A | 9/2007 |
| CN | 101049028 A | 10/2007 |
| CN | 200983052 | 11/2007 |
| CN | 101114080 A | 1/2008 |
| CN | 101142823 A | 3/2008 |
| CN | 100449353 | 1/2009 |
| CN | 101364004 A | 2/2009 |
| CN | 101598863 B | 12/2009 |
| CN | 100591141 | 2/2010 |
| CN | 101660689 A | 3/2010 |
| CN | 102147079 A | 8/2011 |
| CN | 202486493 U | 10/2012 |
| CN | 1910399 B | 5/2013 |
| CN | 104133292 A | 11/2014 |
| CN | 204740413 U | 11/2015 |
| CN | 209171779 U | 7/2019 |
| EP | 0653891 A1 | 5/1995 |
| EP | 0721131 A2 | 7/1996 |
| EP | 0830984 A2 | 3/1998 |
| EP | 0833183 A1 | 4/1998 |
| EP | 0860729 A2 | 8/1998 |
| EP | 0939273 A1 | 9/1999 |
| EP | 0656555 B1 | 3/2003 |
| EP | 2003394 A2 | 12/2008 |
| EP | 1394593 B1 | 6/2010 |
| EP | 2451180 A2 | 5/2012 |
| EP | 1634119 B1 | 8/2012 |
| GB | 2405542 | 2/2005 |
| GB | 2418518 A | 3/2006 |
| GB | 2428100 A | 1/2007 |
| GB | 2482065 A | 1/2012 |
| GB | 2486935 B | 9/2013 |
| JP | H01130783 U | 9/1989 |
| JP | H08211334 | 8/1996 |
| JP | H08237691 A | 9/1996 |
| JP | H08254617 | 10/1996 |
| JP | H08070475 | 12/1996 |
| JP | H08340556 | 12/1996 |
| JP | 2000048618 A | 2/2000 |
| JP | 2000200049 A | 7/2000 |
| JP | 2001093321 A | 4/2001 |
| JP | 2001281456 | 10/2001 |
| JP | 2002049004 A | 2/2002 |
| JP | 2003215349 A | 7/2003 |
| JP | 2003215705 A | 7/2003 |
| JP | 2004319364 A | 11/2004 |
| JP | 2005116266 | 4/2005 |
| JP | 2005135844 A | 5/2005 |
| JP | 2005183030 A | 7/2005 |
| JP | 2005259361 A | 9/2005 |
| JP | 2006004877 A | 1/2006 |
| JP | 2006031941 A | 2/2006 |
| JP | 2006310269 A | 11/2006 |
| JP | 3968742 B2 | 8/2007 |
| JP | H3968742 | 8/2007 |
| JP | 2007273288 A | 10/2007 |
| JP | 2007286652 | 11/2007 |
| JP | 2008204874 A | 9/2008 |
| JP | 2010160527 A | 7/2010 |
| JP | 20110216281 | 10/2011 |

(56) References Cited

FOREIGN PATENT DOCUMENTS

| | | |
|---|---|---|
| JP | 2013015619 | 1/2013 |
| JP | 2013502693 | 1/2013 |
| JP | 2013540083 | 10/2013 |
| KR | 20030064258 | 7/2003 |
| KR | 20090932304 | 12/2009 |
| KR | 20110006773 A | 1/2011 |
| KR | 20110017918 A | 2/2011 |
| KR | 20110067534 A | 6/2011 |
| KR | 20120011228 A | 2/2012 |
| KR | 20120048301 A | 5/2012 |
| KR | 20120049890 A | 5/2012 |
| KR | 20130002646 A | 1/2013 |
| KR | 20140139730 | 12/2014 |
| KR | 101990286 B1 | 6/2019 |
| TW | 200528780 A | 9/2005 |
| TW | M537663 U | 3/2017 |
| WO | 1994006249 B1 | 4/1994 |
| WO | 1995020811 A1 | 8/1995 |
| WO | 1995027915 A1 | 10/1995 |
| WO | 1998021620 A1 | 5/1998 |
| WO | 1999011074 A1 | 3/1999 |
| WO | 2001027528 A1 | 4/2001 |
| WO | 2001061241 A1 | 8/2001 |
| WO | 2001079923 A1 | 10/2001 |
| WO | 2005071449 A2 | 8/2005 |
| WO | 2010021926 A2 | 2/2010 |
| WO | 2011020962 A1 | 2/2011 |
| WO | 2011022342 A2 | 2/2011 |
| WO | 2011068907 A1 | 6/2011 |
| WO | 2011149739 A2 | 12/2011 |
| WO | 2012158574 A1 | 11/2012 |
| WO | 2014011328 A1 | 1/2014 |
| WO | 2015040776 A1 | 3/2015 |
| WO | 2015057625 A1 | 4/2015 |
| WO | 2015143227 A1 | 9/2015 |
| WO | 2015157184 A1 | 10/2015 |
| WO | 2015190311 A1 | 12/2015 |
| WO | 2018035492 A1 | 2/2018 |
| WO | 2018208618 A1 | 11/2018 |
| WO | 2019055755 A1 | 3/2019 |
| WO | 2019067846 A1 | 4/2019 |
| WO | 2019147762 A1 | 8/2019 |

OTHER PUBLICATIONS

CN-201380026058.7 Chinese 1st Office Action of the State Intellectual Property Office of P.R. China dated Nov. 2, 2016.
CN-201380063047.6 Chinese Office Action of the State Intellectual Property Office of P.R. China dated Oct. 9, 2016.
EP-11842021.5 Office Action dated Sep. 2, 2016.
EP-13790775.4 Office Action dated Aug. 29, 2016.
EP-13791437.0 European first office action dated Aug. 30, 2016.
EP-14754859.8 European Extended Search Report of European Patent Office dated Oct. 14, 2016.
3M™ ePrivacy Filter software professional version; http://www.cdw.com/shop/products/3M-ePrivacy-Filter-software-professional-version/3239412.aspx?cm_mmc=ShoppingFeeds-_-ChannelIntelligence-_-Software-_-3239412_3MT%20ePrivacy%20Filter%20software%20professional%20version_3MF-EPFPRO&cpncode=37-7582919&srccode=cii_10191459#PO; Copyright 2007-2016.
CN-200980150139.1 1st Office Action dated Nov. 2, 2014.
CN-200980150139.1 2nd Office Action dated May 4, 2015.
EP16860628.3 European Search Report dated Apr. 26, 2019.
Brudy et al., "Is Anyone Looking? Mitigating Shoulder Surfing on Public Displays through Awareness and Protection", Proceedings of the International Symposium on Pervasive Displays, Jun. 4, 2014, XP055511160, pp. 1-6.
Lipton, "Stereographics: Developers' Handbook", Stereographic Developers Handbook, Jan. 1, 1997, XP002239311, p. 42-49.
Marjanovic, M.,"Interlace, Interleave, and Field Dominance," http://www.mir.com/DMG/interl.html, pp. 1-5 (2001).

PCT/DE98/02576 International search report and written opinion of international searching authority dated Mar. 4, 1999 (WO99/11074).
PCT/US2007/85475 International preliminary report on patentability dated May 26, 2009.
PCT/US2007/85475 International search report and written opinion dated Apr. 10, 2008.
PCT/US2009/060686 international preliminary report on patentability dated Apr. 19, 2011.
PCT/US2009/060686 international search report and written opinion of international searching authority dated Dec. 10, 2009.
PCT/US2011/061511 International Preliminary Report on Patentability dated May 21, 2013.
PCT/US2011/061511 International search report and written opinion of international searching authority dated Jun. 29, 2012.
PCT/US2012/037677 International search report and written opinion of international searching authority dated Jun. 29, 2012.
PCT/US2012/042279 International search report and written opinion of international searching authority dated Feb. 26, 2013.
PCT/US2012/052189 International search report and written opinion of the international searching authority dated Jan. 29, 2013.
PCT/US2013/041192 International search report and written opinion of international searching authority dated Aug. 28, 2013.
PCT/US2013/041228 International search report and written opinion of international searching authority dated Aug. 23, 2013.
PCT/US2013/041235 International search report and written opinion of international searching authority dated Aug. 23, 2013.
PCT/US2013/041237 International search report and written opinion of international searching authority dated May 15, 2013.
PCT/US2013/041548 International search report and written opinion of international searching authority dated Aug. 27, 2013.
PCT/US2013/041619 International search report and written opinion of international searching authority dated Aug. 27, 2013.
PCT/US2013/041655 International search report and written opinion of international searching authority dated Aug. 27, 2013.
PCT/US2013/041683 International search report and written opinion of international searching authority dated Aug. 27, 2013.
PCT/US2013/041697 International search report and written opinion of international searching authority dated Aug. 23, 2013.
PCT/US2013/041703 International search report and written opinion of international searching authority dated Aug. 27, 2013.
PCT/US2013/049969 International search report and written opinion of international searching authority dated Oct. 23, 2013.
PCT/US2013/063125 International search report and written opinion of international searching authority dated Jan. 20, 2014.
PCT/US2013/063133 International search report and written opinion of international searching authority dated Jan. 20, 2014.
PCT/US2013/077288 International search report and written opinion of international searching authority dated Apr. 18, 2014.
PCT/US2014/017779 International search report and written opinion of international searching authority dated May 28, 2014.
PCT/US2014/042721 International search report and written opinion of international searching authority dated Oct. 10, 2014.
PCT/US2014/057860 International Preliminary Report on Patentability dated Apr. 5, 2016.
PCT/US2014/057860 International search report and written opinion of international searching authority dated Jan. 5, 2015.
PCT/US2014/060312 International search report and written opinion of international searching authority dated Jan. 19, 2015.
PCT/US2014/060368 International search report and written opinion of international searching authority dated Jan. 14, 2015.
PCT/US2014/065020 International search report and written opinion of international searching authority dated May 21, 2015.
PCT/US2015/000327 International search report and written opinion of international searching authority dated Apr. 25, 2016.
PCT/US2015/021583 International search report and written opinion of international searching authority dated Sep. 10, 2015.
PCT/US2015/038024 International search report and written opinion of international searching authority dated Dec. 30, 2015.
PCT/US2016/027297 International search report and written opinion of international searching authority dated Jul. 26, 2017.
PCT/US2016/027350 International search report and written opinion of the international searching authority dated Jul. 25, 2016.

(56) References Cited

OTHER PUBLICATIONS

PCT/US2016/034418 International search report and written opinion of the international searching authority dated Sep. 7, 2016.
Robinson et al., U.S. Appl. No. 14/751,878 entitled "Directional privacy display" filed Jun. 26, 2015.
Robinson et al., U.S. Appl. No. 15/097,750 entitled "Wide angle imaging directional backlights" filed Apr. 13, 2016.
Robinson et al., U.S. Appl. No. 15/098,084 entitled "Wide angle imaging directional backlights" filed Apr. 13, 2016.
Robinson, U.S. Appl. No. 13/300,293 entitled "Directional flat illuminators" filed Nov. 18, 2011.
RU-2013122560 First office action dated Jan. 1, 2014.
RU-2013122560 Second office action dated Apr. 10, 2015.
Tabiryan et al., "The Promise of Diffractive Waveplates," Optics and Photonics News, vol. 21, Issue 3, pp. 40-45 (Mar. 2010).
Travis, et al. "Backlight for view-sequential autostereo 3D", Microsoft E&DD Applied Sciences, (date unknown), 25 pages.
Travis, et al. "Collimated light from a waveguide for a display," Optics Express, vol. 17, No. 22, pp. 19714-19719 (2009).
Williams S P et al., "New Computational Control Techniques and Increased Understanding for Stereo 3-D Displays", Proceedings of SPIE, SPIE, US, vol. 1256, Jan. 1, 1990, XP000565512, p. 75, 77, 79.
Robinson et al., U.S. Appl. No. 14/186,862 entitled "Directional Backlight" filed Feb. 21, 2014.
Robinson et al., U.S. Appl. No. 62/167,203 entitled "Wide angle imaging directional backlights" filed May 27, 2015.
Cootes et al., "Active Appearance Models", IEEE Trans. Pattern Analysis and Machine Intelligence, 23(6):681-685, 2001.
Bar-Shalom et al., "Multitarget-Multisensor Tracking: Principles and Techniques", IEEE Aerospace and Electronic Systems Magazine, 1995.
Simonyan et al., "Very Deep Convolutional Networks for Large-Scale Image Recognition", ICLR 2015.
AU-2011329639 Australia Patent Examination Report No. 1 dated Mar. 6, 2014.
AU-2013262869 Australian Office Action of Australian Patent Office dated Feb. 22, 2016.
AU-2015258258 Australian Office Action of Australian Patent Office dated Jun. 9, 2016.
Bahadur, "Liquid crystals applications and uses," World Scientific, vol. 1, pp. 178 (1990).
CA-2817044 Canadian office action dated Jul. 14, 2016.
CN-201180065590.0 Office first action dated Dec. 31, 2014.
CN-201180065590.0 Office second action dated Oct. 21, 2015.
CN-201180065590.0 Office Third action dated Jun. 6, 2016.
CN-201280034488.9 2d Office Action from the State Intellectual Property Office of P.R. China dated Mar. 22, 2016.
CN-201280034488.9 1st Office Action from the State Intellectual Property Office of P.R. China dated Jun. 11, 2015.
CN-201380026045.X Chinese First Office Action of Chinese Patent Office dated Aug. 29, 2016.
CN-201380026047.9 Chinese 1st Office Action of the State Intellectual Property Office of P.R. dated Dec. 18, 2015.
CN-201380026047.9 Chinese 2d Office Action of the State Intellectual Property Office of P.R. dated Jul. 12, 2016.
CN-201380026050.0 Chinese 1st Office Action of the State Intellectual Property Office of P.R. dated Jun. 3, 2016.
CN-201380026059.1 Chinese 1st Office Action of the State Intellectual Property Office of P.R. dated Apr. 25, 2016.
CN-201380026076.5 Office first action dated May 11, 2016.
CN-201380049451.8 Chinese Office Action of the State Intellectual Property Office of P.R. dated Apr. 5, 2016.
CN-201380063055.0 Chinese 1st Office Action of the State Intellectual Property Office of P.R. dated Jun. 23, 2016.
CN-201480023023.2 Office action dated Aug. 12, 2016.
EP-07864751.8 European Search Report dated Jun. 1, 2012.
EP-07864751.8 Supplementary European Search Report dated May 29, 2015.
EP-09817048.3 European Search Report dated Apr. 29, 2016.
EP-11842021.5 Office Action dated Dec. 17, 2014.
EP-11842021.5 Office Action dated Oct. 2, 2015.
EP-13758536.0 European Extended Search Report of European Patent Office dated Feb. 4, 2016.
EP-13790013.0 European Extended Search Report of European Patent Office dated Jan. 26, 2016.
EP-13790141.9 European Extended Search Report of European Patent Office dated Feb. 11, 2016.
EP-13790195.5 European Extended Search Report of European Patent Office dated Mar. 2, 2016.
EP-13790267.2 European Extended Search Report of European Patent Office dated Feb. 25, 2016.
EP-13790274.8 European Extended Search Report of European Patent Office dated Feb. 8, 2016.
EP-13790775.4 European Extended Search Report of European Patent Office dated Oct. 9, 2015.
EP-13790809.1 European Extended Search Report of European Patent Office dated Feb. 16, 2016.
EP-13790942.0 European Extended Search Report of European Patent Office dated May 23, 2016.
EP-13791332.3 European Extended Search Report of European Patent Office dated Feb. 1, 2016.
EP-13791437.0 European Extended Search Report of European Patent Office dated Oct. 14, 2015.
EP-13822472.0 European Extended Search Report of European Patent Office dated Mar. 2, 2016.
EP-13843659.7 European Extended Search Report of European Patent Office dated May 10, 2016.
EP-13844510.1 European Extended Search Report of European Patent Office dated May 13, 2016.
EP-13865893.5 European Extended Search Report of European Patent Office dated Oct. 4, 2016.
EP-16150248.9 European Extended Search Report of European Patent Office dated Jun. 16, 2016.
Ian Sexton et al: "Stereoscopic and autostereoscopic display-systems",—IEEE Signal Processing Magazine, May 1, 1999 (May 1, 1999 ), pp. 85-99, XP055305471, Retrieved from the Internet: RL:http://ieeexplore.ieee.org/iel5/79/16655/00768575.pdf [retrieved on Sep. 26, 2016].
JP-2009538527 Reasons for rejection dated Jul. 17, 2012 with translation.
JP-200980150139.1 1st Office Action dated Feb. 11, 2014.
JP-200980150139.1 2d Office Action dated Apr. 5, 2015.
JP-2013540083 Notice of reasons for rejection of Jun. 30, 2015.
JP-2013540083 Notice of reasons for rejection with translation dated Jun. 21, 2016.
Kalantar, et al. "Backlight Unit With Double Surface Light Emission," J. Soc. Inf. Display, vol. 12, Issue 4, pp. 379-387 (Dec. 2004).
KR-20117010839 1st Office action (translated) dated Aug. 28, 2015.
KR-20117010839 2d Office action (translated) dated Apr. 28, 2016.
Languy et al., "Performance comparison of four kinds of flat nonimaging Fresnel lenses made of polycarbonates and polymethyl methacrylate for concentrated photovoltaics", Optics Letters, 36, pp. 2743-2745.
Adachi, et al. "P-228L: Late-News Poster: Controllable Viewing-Angle Displays using a Hybrid Aligned Nematic Liquid Crystal Cell", ISSN, SID 2006 Digest, pp. 705-708.
Brudy et al., "Is Anyone Looking? Mitigating Shoulder Surfing on Public Displays through Awareness and Protection", Proceedings of the International Symposium on Persuasive Displays (Jun. 3, 2014), pp. 1-6.
CN201780030715.3 Notification of the First Office Action dated Jan. 21, 2020.
EP-16860628.3 Extended European Search Report of European Patent Office dated Apr. 26, 2019.
EP-17799963.8 Extended European Search Report of European Patent Office dated Oct. 9, 2019.
Gass, et al. "Privacy LCD Technology for Cellular Phones", Sharp Laboratories of Europe Ltd, Mobile LCD Group, Feb. 2007, pp. 45-49.
Ishikawa, T., "New Design for a Highly Collimating Turning Film", SID 06 Digest, pp. 514-517.

(56) References Cited

OTHER PUBLICATIONS

PCT/US2016/058695 International search report and written opinion of the international searching authority dated Feb. 28, 2017.
PCT/US2017/032734 International search report and written opinion of the international searching authority dated Jul. 27, 2017.
PCT/US2018/031206 International search report and written opinion of the international searching authority dated Jul. 20, 2018.
PCT/US2018/031218 International Preliminary Report on Patentability dated Nov. 21, 2019.
PCT/US2018/031218 International search report and written opinion of the international searching authority dated Jul. 19, 2018.
PCT/US2018/051021 International search report and written opinion of the international searching authority dated Nov. 21, 2018.
PCT/US2018/051027 International search report and written opinion of the international searching authority dated Nov. 30, 2018.
PCT/US2018/053328 International search report and written opinion of the international searching authority dated Nov. 30, 2018.
PCT/US2018/059249 International search report and written opinion of the international searching authority dated Jan. 3, 2019.
PCT/US2018/059256 International search report and written opinion of the international searching authority dated Jan. 3, 2019.
PCT/US2019/014889 International search report and written opinion of the international searching authority dated May 24, 2019.
PCT/US2019/014902 International search report and written opinion of the international searching authority dated Jun. 25, 2019.
PCT/US2019/023659 International search report and written opinion of the international searching authority dated Jun. 10, 2019.
PCT/US2019/038409 International search report and written opinion of the international searching authority dated Sep. 19, 2019.
PCT/US2019/038466 International search report and written opinion of the international searching authority dated Nov. 5, 2019.
PCT/US2019/042027 International search report and written opinion of the international searching authority dated Oct. 15, 2019.
PCT/US2019/054291 International search report and written opinion of the international searching authority dated Jan. 6, 2020.
PCT/US2019/059990 International search report and written opinion of the international searching authority dated Feb. 28, 2020.
PCT/US2019/066208 International search report and written opinion of the international searching authority dated Feb. 27, 2020.
PCT/US2020/017537 International search report and written opinion of the international searching authority dated Apr. 29, 2020.
PCT/US2020/040686 International search report and written opinion of the international searching authority dated Nov. 20, 2020.
PCT/US2020/044574 International search report and written opinion of the international searching authority dated Oct. 21, 2020.
Weindorf et al., "Active Circular Polarizer OLED E-Mirror", Proceedings of the Society for Information Display 25th Annual Symposium of Vehicle Displays, Livonia, MI, pp. 225-237, Sep. 25-26, 2018.
PCT/US2020/053863 International search report and written opinion of the international searching authority dated Mar. 12, 2021.
PCT/US2020/060155 International search report and written opinion of the international searching authority dated Feb. 5, 2021.
PCT/US2020/060191 International search report and written opinion of the international searching authority dated Feb. 8, 2021.
PCT/US2020/063638 International search report and written opinion of the international searching authority dated Mar. 2, 2021.
PCT/US2020/064633 International search report and written opinion of the international searching authority dated Mar. 15, 2021.
Robson, et al. "Spatial and temporal contrast-sensitivity functions of the visual system", J. Opt. Soc. Amer., vol. 56, pp. 1141-1142 (1966).

* cited by examiner

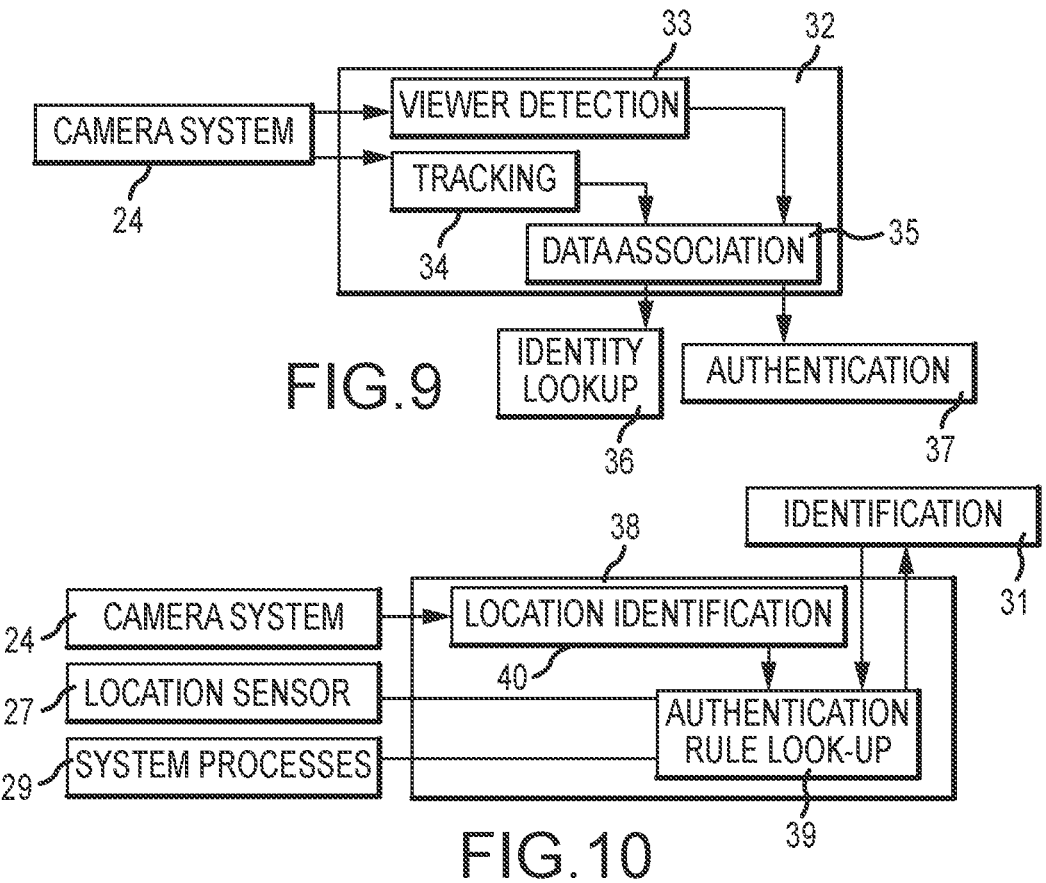
FIG.9
FIG.10
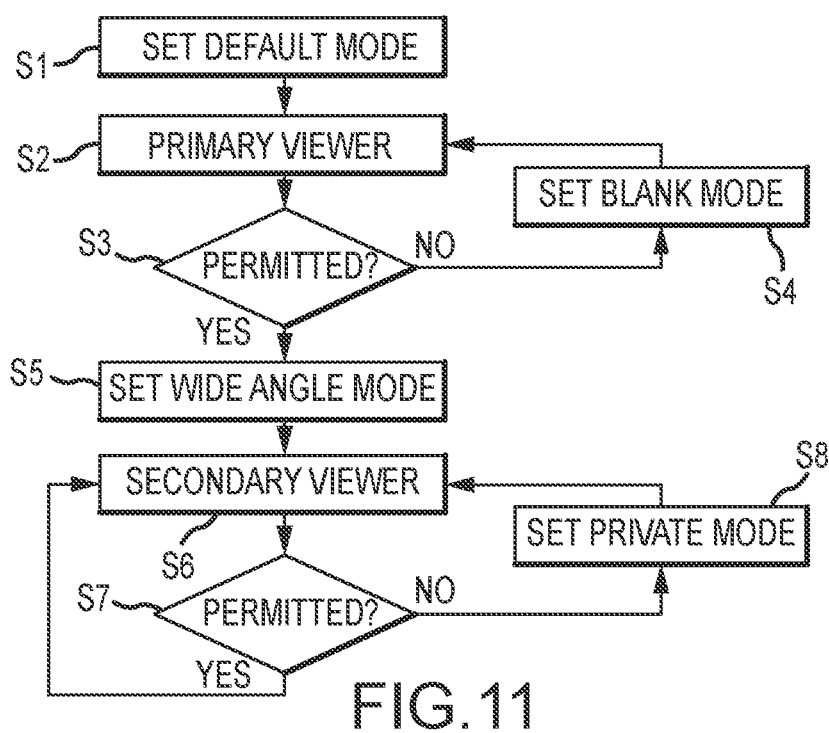
FIG.11

INTELLIGENT PRIVACY SYSTEM, APPARATUS, AND METHOD THEREOF

CROSS-REFERENCE TO RELATED APPLICATIONS

This application claims priority to U.S. Provisional Patent Appl. No. 62/246,584, entitled "Intelligent privacy system, apparatus, and method thereof" filed Oct. 26, 2015 and to U.S. Provisional Patent Appl. No. 62/261,151, entitled "Intelligent privacy system, apparatus, and method thereof" filed Nov. 30, 2015, which are both herein incorporated by reference in their entireties.

TECHNICAL FIELD

This disclosure generally relates to privacy control of a directional display apparatus.

BACKGROUND

Display devices are ubiquitous. There are many situations where viewers of apparatuses including display devices are concerned about privacy issues when using the display device in public or unsecure environments, for example when working on confidential or sensitive documents. Examples of display devices where such concerns exist include computer apparatuses, such as desktop computers, laptop computers and tablets; mobile communication devices, such as smartphones; and display devices in static installations, such as kiosks and ATMs. In such circumstances, the primary viewer is required to be vigilant of other people in their surroundings and to take action to obscure or turn off the display device when unwanted, secondary viewers are present. It would be desirable for the display device to have a privacy control function which assists the primary user in preventing unwanted viewing of the displayed image.

There exist privacy functions which may determine that secondary viewers are viewing a display device, and in response may blur the displayed image. However, typically the display device is then blurred for everyone, including the primary viewer. This is less than desirable and it may be more constructive for the primary viewer to be able to continue viewing.

Display devices which are directional are known. Examples of a type of directional display device using a directional backlight are disclosed in U.S. Patent Publ. No. 2012/0127573, and U.S. Patent Publ. No. 2014/0240828. Directional display devices of this and other types may direct the displayed image into a viewing window, which may have a finite width in a viewing plane, being typically much narrower than the viewing width of a conventional display device. Such a directional display device may be operated in a mode in which the displayed image is directed into a viewing window of relatively narrow width in order to provide a privacy function. The privacy function may be used to provide the displayed image with reduced or negligible visibility to a secondary viewer.

An aspect of the present disclosure is concerned with the functionality of a directional display device used to provide a privacy function.

BRIEF SUMMARY

According to a first aspect of the present disclosure, there is provided a privacy control method of controlling a directional display device that is capable of directing a displayed image into a viewing window that is adjustable, the method comprising: directing the displayed image into a viewing window; detecting the presence of one or more secondary viewers in addition to a primary viewer; in the event of detecting the presence of the one or more secondary viewers, deciding whether the one or more secondary viewers is permitted to view the displayed image; and adjusting the viewing window in response to detecting the presence of one or more secondary viewers and deciding that the one or more secondary viewers is not permitted to view the displayed image.

In this aspect of the disclosure, advantage is taken of a directional display device that is capable of directing a displayed image into a viewing window that is adjustable, for example by having variable width and/or variable position. In the privacy control method, while directing the displayed image into a viewing window, there is detected the presence of one or more secondary viewers in addition to a primary viewer. This detection may be used in the control of the viewing window. In particular the viewing window may be adjusted when it is decided that the secondary viewer is not permitted to view the displayed image. Such adjustment may reduce the visibility of the viewing window to the secondary viewer. In a first example, the adjustment may decrease the width of the viewing window. In a second example, the adjustment may shift the position of the viewing window away from the secondary viewer. By way of example, the directional display device may be controlled between (a) a normal mode in which no adjustment is made, which in the first example may cause the viewing window to have a maximum width, and (b) a privacy mode in which the viewing window is adjusted, which in the first example may cause the viewing window to have a width that is sufficient only for viewing by a primary viewer.

The detection of the presence of one or more secondary viewers in addition to the primary viewer may be performed in various ways, some non-limitative examples being as follows.

In one example, the method may further comprise capturing a viewing region image, in which case the presence of one or more secondary viewers may comprise analyzing the viewing region image.

In another example, the presence of one or more secondary viewers may comprise detecting an electromagnetic tag carried by the one or more secondary viewers.

The decision of whether the one or more secondary viewers is permitted to view the displayed image may be taken in dependence on one or a combination of a variety of factors, some non-limitative examples being as follows. This provides powerful control of the privacy function.

In one example of such a factor, the decision may be taken in dependence on a comparison of image information derived from a captured viewing region image with a database that associates image information of viewers with viewer permission information.

In another example of such a factor, the decision may be taken in dependence on a comparison of the identity of the one or more secondary viewers determined from an electromagnetic tag with a database that associates viewers with viewer permission information.

In another example of such a factor, the decision may be taken in dependence on information about the location of the display device. Such information may comprise the geographical location of the display device based on the output of a location sensor and/or may comprise information derived from a viewing region image.

Further according to the first aspect of the present disclosure, there may be provided a directional display apparatus capable of implementing a similar privacy control method.

According to a second aspect of the present disclosure, there is provided a method of controlling a directional display device that is capable of directing a displayed image into a viewing window of variable width, the method comprising: directing a displayed image into a viewing window, detecting relative movement between a viewer and the display device; and increasing the width of the viewing window in response to detecting said relative movement.

In this aspect of the disclosure, advantage is taken of a directional display device that is capable of directing a displayed image into a viewing window of variable width. In the privacy control method, while directing the displayed image into a viewing window, there is detected the relative movement between a viewer and the display device. The width of the viewing window may be increased in response to detecting said relative movement.

When the viewer is moving, as a viewing window typically has some spatial non-uniformity in brightness, there is a risk of the viewer perceiving fluctuations in the brightness of the displayed image as they move between different portions of the viewing window. This might be perceived in some circumstances as flicker. However, by increasing the width of the viewing window when relative movement of the viewer is detected, such the perception of such brightness fluctuations may be reduced.

The relative movement which is detected may be, for example, linear motion of the viewer relative to the display device laterally of the viewing window, and or vibratory movement of the display device relative to the viewer.

The relative movement may be detected using a motion sensor mounted in the display device or, where an image of the viewing region is captured, may be detected by analyzing the viewing region image to determine the position of the viewer.

Further according to the first aspect of the present disclosure, there may be provided a directional display apparatus capable of implementing a similar privacy control method.

The first and second aspects of the disclosure may be applied in combination. Similarly, the optional features of the first and second aspects may be implemented together in any combination.

BRIEF DESCRIPTION OF THE DRAWINGS

Non-limitative embodiments are illustrated by way of example in the accompanying figures, in which like reference numbers indicate similar parts, and in which:

FIG. 9 is a block diagram of an observer tracking module in an example directional display apparatus;

FIG. 10 is a block diagram of a context module in an example directional display apparatus;

FIG. 11 is a flow chart of the operation of an authentication module in an example directional display apparatus;

DETAILED DESCRIPTION

Figure 1:
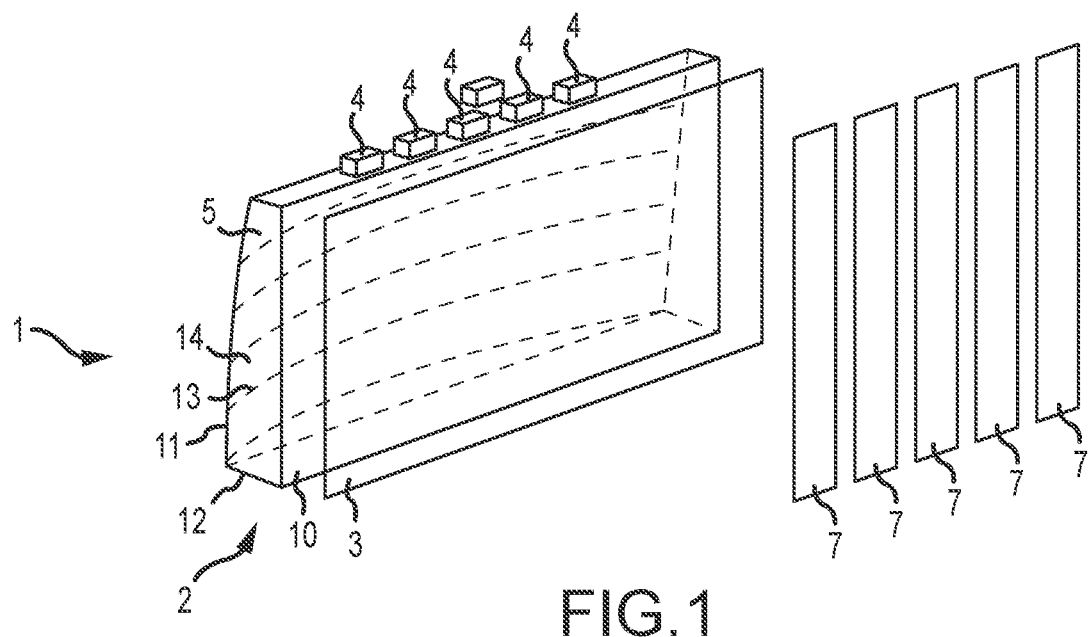
FIG. 1 is a perspective view of an example directional display device in which a privacy control function may be implemented.

FIG. 1 illustrates a directional display device 1 to which a privacy control method may be applied.

The directional display device 1 is an example of a device that is capable of directing a displayed image into a viewing window that is adjustable, in this example by having variable position and width. In this example, the directional display device 1 is a type disclosed in U.S. Patent Publ. No. 2012/0127573, and U.S. Patent Publ. No. 2014/0240828, which are herein incorporated by reference in their entireties. A general description of the directional display device 1 is given below, but reference is made to U.S. Patent Publ. No. 2012/0127573, and U.S. Patent Publ. No. 2014/0240828 for further details of the construction and operation that may be applied here.

The directional display device 1 includes a directional backlight 2 and a spatial light modulator 3.

The directional backlight 2 directs light into optical windows. In particular, the directional backlight includes an array of light sources 4 and a waveguide 5. The light sources 4 may be light emitting diodes (LEDs). The light sources 4 may alternatively be of other types, for example diode sources, semiconductor sources, laser sources, local field emission sources, organic emitter arrays, and so forth.

The waveguide 5 directs light from each light source 4 into a respective viewing window 7.

In general terms, a possible construction of the waveguide 5 is as follows. The waveguide 5 has first and second guide surfaces 10 and 11 and a reflective end 12 which may have positive optical power. Input light from the light sources 4 is guided through the waveguide 5 by the first and second guide surfaces 10 and 11 to the reflective end 10 where it is reflected and directed back through the waveguide 5.

The second guide surface 12 includes extraction features 13 extending in a lateral direction across the waveguide 5 facing the reflective end 10. The extraction features 13 are oriented to reflect light from the light sources, after reflection from the reflective end 10, through the first guide surface 11 as output light. The intermediate regions 14 of the second guide surface 12 intermediate the extraction features 13 guide light through the waveguide without extracting it. The second guide surface 12 may have a stepped shape that provides the extraction features 13 and intermediate regions 14.

The waveguide 5 may provide focusing of the output light in the lateral direction. The focusing may be achieved, at least in part, by the extraction features 13 having positive optical power in the lateral direction. As a result, the output light derived from individual light sources 4 is directed into respective optical windows 7 in a viewing plane. The direction in which the optical windows 7 lie, relative to the directional display device 1 is dependent on the input position of the light source 4. Thus, the optical windows 7 produced by the array of light sources 4 are in output directions that are distributed in the lateral direction in dependence on the input positions of the respective light sources 4.

Further details of possible constructions of the waveguide 5 that causes it to direct light into optical windows are disclosed in more detail in U.S. Patent Publ. No. 2012/0127573 and U.S. Patent Publ. No. 2014/0240828.

The spatial light modulator 3 is capable of displaying an image. The spatial light modulator 3 is transmissive and modulates the light passing therethrough. The spatial light modulator 3 may be a liquid crystal display (LCD) but this is merely by way of example, and other spatial light modulators or displays may be used including LCOS, DLP devices, and so forth.

The spatial light modulator 3 extends across the first guide surface 11 of the waveguide 5 and so modulates the light that is output therethrough. Thus, the image displayed on the spatial light modulator 3 is directed into the optical windows 7. The extraction features 13 may be provided across an area of the waveguide 5 corresponding to the entire area of the spatial light modulator 3. In that case, the output light is output into the optical windows across the entire area of the spatial light modulator 2.

As described above, selective operation of the light sources 4 allows light to be directed into selected viewing windows. In principle a single light source 4 may be operated to direct light into a viewing window having a single optical window 7, but typically plural light sources 4 are operated at a time to direct light into a viewing window having a plural optical windows 7. By selectively varying the light sources 4 that are operated, the resultant viewing window may be provided with a variable position and width, and in this manner be adjustable.

The waveguide 5 including extraction features 13 may be replaced by a waveguide as of the type disclosed for example in U.S. Pat. No. 7,970,246, which is herein incorporated by reference in its entirety, and which may be referred to as a "wedge type directional backlight".

Figure 2:
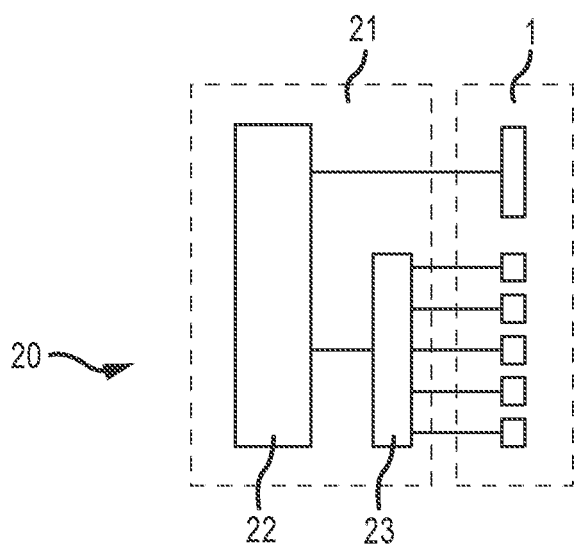
FIG. 2 is a circuit diagram of an example directional display apparatus incorporating the directional display device of FIG. 1.

The directional display device 1 forms part of a directional display apparatus 20 as shown in FIG. 2 that also includes a control system 21 that controls the directional display device 1 as follows. The control system 21 includes a control circuit 22 and a driver circuit 23.

The control circuit 22 may be implemented by a processor executing a suitable program, although optionally some functions of the control circuit 22 may be implemented by dedicated hardware.

The driver circuit 23 drives the light sources 4 by supplying a drive signal to each light source 4. In a conventional manner, the driver circuit 23 includes appropriate electronic circuitry to generate drive signals of sufficient power to drive the light sources 4.

The control circuit 22 controls the spatial light modulator 3 to display an image.

The control circuit 22 also controls the driver circuit 23 to drive the light sources 4. The light sources 4 are thus operated to output light with a variable luminous flux in accordance with the respective drive signal. The driver circuit 23 is supplied with a luminous flux profile from the control circuit 22, the luminous flux profile being a control signal that represents the desired luminous flux of each light source 4 across the array. Typically, the luminous flux profile represents the desired luminous fluxes in relative terms, not absolute terms. The driver circuit 23 generates drive signals for each light source 4 in accordance with the luminous flux profile. Thus, the luminous flux profile thus effectively represents the shape of the viewing window, including its width and position.

The control circuit 22 supplies different luminous flux profiles to the driver circuit 23 in different modes. Changing between modes may occur instantaneously, or occur over several frames of the image display in order to provide a more comfortable viewing performance for a viewer. Examples of luminous flux profiles supplied in different modes will now be described with reference to FIGS. 3 to 6 which illustrate different luminous flux profiles, wherein the bars represent the level of the luminous fluxes of successive light sources 4 across the array.

Figure 3:
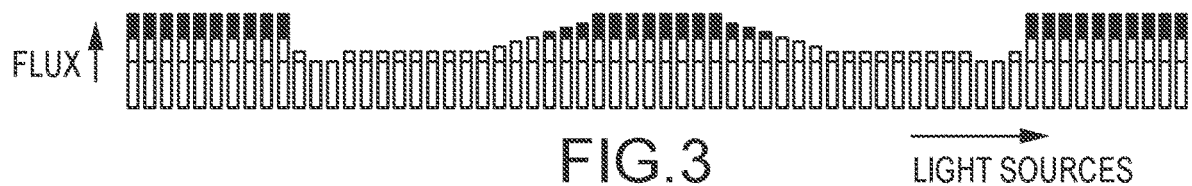
FIG. 3, FIG. 4, FIG. 5, and FIG. 6 are diagrams of different luminous flux profiles.

FIG. 3 shows an example of a luminous flux profile in a wide angle mode. In this case, all the light sources 4 are operated, albeit with non-uniform luminous fluxes. As a result the viewing window includes optical windows 7 corresponding to every light source 4, hence having the maximum possible width.

Figure 4:
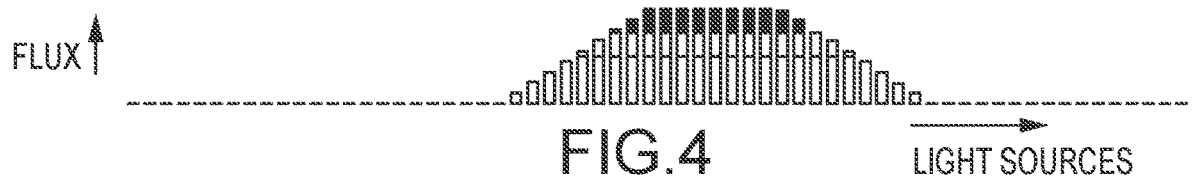

FIG. 4 show an example of a first luminous flux profile in a privacy mode of a type in which the width of the viewing window is decreased compared to the wide angle mode. In this example, a central group of light sources 4 corresponding to the center of the viewing window are operated with maximum luminous flux and light sources 4 on either side of the central group are operated with reducing luminous flux. As a result, the viewing window includes optical windows 7 corresponding to the operated light sources 4.

Figure 5:
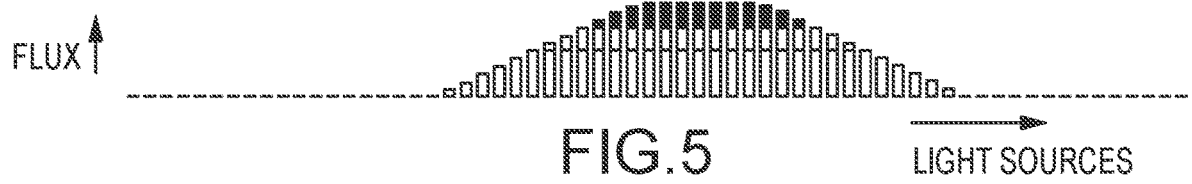

FIG. 5 show an example of a second luminous flux profile in the privacy mode of a type in which the width of the viewing window is decreased compared to the wide angle mode. The form of the second luminous flux profile is the same as the luminous flux profile, except that the roll-off of the luminous flux of the light sources 4 on either side of the central group is less steep. As a result, the viewing window includes optical windows 7 corresponding to the operated light sources 4, and so the width of the viewing window is increased compared to the first luminous flux profile.

As an alternative way of increasing the width of the viewing window compared to the first luminous flux profile, it is possible to increase the number of light sources 4 in the central group of light sources 4 that are operated with maximum luminous flux. In that case, the roll-off of the luminous flux of the light sources 4 on either side of the central group may be the same as in the first luminous flux profile, or may additionally be less steep than in the first luminous flux profile (as in the second luminous flux profile).

To make the position of the viewing window adjustable, the first and second luminous flux profiles may be changed to move the viewing window from the central position as shown in FIGS. 4 and 5 to a shifted position, for example to track the position of the viewer as described below. In this case, the first and second luminous flux profiles have the same shape as in FIGS. 4 and 5 but centered on a different light source 4 which may be any of the light sources 4.

Figure 6:
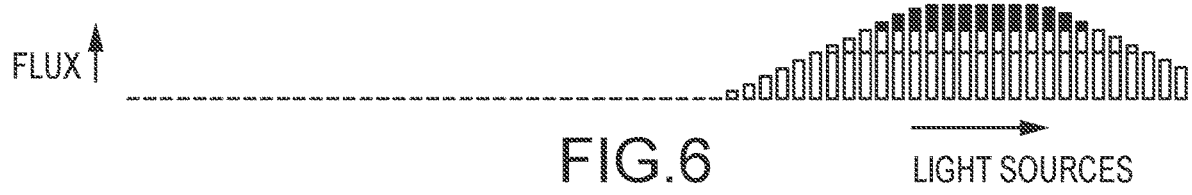

FIG. 6 show an example of this, in particular showing the second luminous flux profile in a privacy mode when the viewing window is moved. In this case, the shape of the luminous flux profile remains the same, but the positions of the operated light sources 4 are shifted to shift the viewing window. In this manner, the viewing window may be shifted to any lateral position. It is not essential to shift the viewing window in this manner. In some implementations, the viewing window may have a fixed position, typically corresponding to a central viewing position in front of the directional display device 1.

The arrangement of the directional display device 1 described above is given as an example, but the directional display device 1 may alternatively be of any other type that is capable of directing a displayed image into a viewing window of variable width and/or of variable position.

Figure 7:
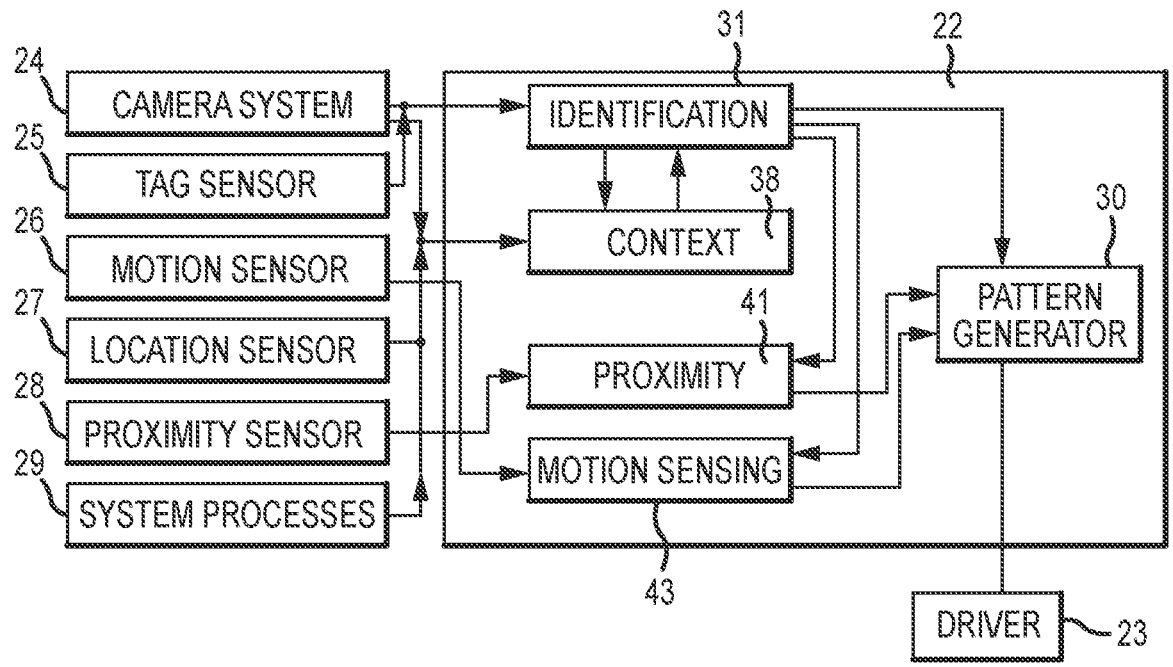
FIG. 7 is a block diagram of function blocks and data flow in an example directional display apparatus.

FIG. 7 shows further components of the directional display apparatus 20 and function blocks and data flow within the control circuit 22, as will now be described.

The directional display apparatus 20 includes a camera system 24 arranged to capture an image of the viewing region, including the viewing plane. The camera system 24 may include a single camera or plural cameras.

Where the camera system 24 includes plural cameras, the following considerations may apply. The control circuit 22 may find the spatial relationship of the cameras in a calibration step using a reference image, or the spatial relationship may be specified a priori. The cameras face towards viewing region, their orientation depending on the field of view of each camera. One example to determine the orientation of a set of cameras is by maximizing the combined field of view of all cameras. The cameras may have different fields of view.

The cameras may have different sensing modalities. Examples for these are RGB data, infrared data, Time-of-Flight data, and Push-broom. Generally, a constraint is that the output of the camera system allows for angular localization of the observations with respect to the directional display device 1. One way to provide angular localization is to use the position and orientation of a camera with respect to the directional display device 1 and to back-project the observed location (image measurement), yielding a line of sight along the observation is positioned.

One way to estimate spatial localization in front of the directional display device 1 is to use the expected spatial extent of an object, and the extent of the measurement in any of the images of the camera system 24. Using the angular localization described above, the expected spatial extent can be related to the observed and a distance estimate. Another way to estimate spatial localization is to use the relative position of more than one camera to triangulate two image measurements.

The output of the camera system is a set of images (measurements allowing angular localization), the orientation and position of the cameras with respect to the directional display device 1, the sensing modalities and internal parameters of the sensor (focal length, optical axis) that may be used for angular localization.

The directional display apparatus 20 further includes a tag sensor 25 arranged to detect electromagnetic tags that allow identification of a viewer in the vicinity of the directional display device 1. The tag sensor 25 produces an output signal that may include an identifier from the detected tag that is unique.

The tag sensor 25 may be any sensor capable of providing such identification electromagnetically. One example is a tag sensor 25 using RFID (radio frequency identification tags) technology. In that case, RFID tags may be provided in an object such as a badge worn by viewers. Another embodiment is a tag sensor 25 using low power Bluetooth or the MAC address of a WiFi device, in which case the tag sensor 25 may sense for this data wirelessly, e.g. using an RFID sensor, a Bluetooth device, a WiFi device.

The directional display apparatus 20 further includes a motion sensor 26 that detects motion of the directional display device 1, and hence effectively detects relative motion between the viewer and the directional display device 1. The motion sensor 26 produces an output signal representing the detected motion.

The motion sensor 26 may be of any suitable type for detecting motion. By way of example, the motion sensor 26 may be a gyroscope, an IMU (inertial motion unit), or a differential GPS (global positioning system) device. The spatial resolution of the motion sensor 26 is typically less than 10 cm, more often less than 1 cm.

The directional display apparatus 20 further includes a location sensor 27 that determines the geographical location of the directional display device 1. The location sensor 27 produces an output signal representing the determined location.

The location sensor 27 may be of any suitable type, typically providing an absolute location, allowing localization of the direction display device 1 on Earth. In one example, the location sensor 27 may be a GPS sensor.

The directional display apparatus 20 further includes a proximity sensor 28 that detects the proximity of an object from the front of the directional display device 1, typically in the form of a scalar value indicating the distance of detected object. The proximity sensor 28 may be of any suitable type. By way of example, the proximity sensor may be an IR (infra-red) sensor, a sonar sensor or an ambient light sensor.

Each of the camera system 24, the tag sensor 25, the motion sensor 26, the location sensor 27, and the proximity sensor 28 supply output signals to the control circuit 22, continuously but at rates that may vary as between the different components, typically at above 1 Hz for at least the camera system 24 and the motion sensor 26, but perhaps at slower rates for the tag sensor 25, the location sensor 27, and the proximity sensor 28.

There will now be described some functional modules of the control circuit 22. Each functional module provides particular function and may be implemented in software executed by a processor.

The directional display apparatus 20 further includes a list 29 of system processes being performed by the control circuit 22, the list 29 being stored in a memory of the control circuit 22.

One functional module of the control circuit 22 is a pattern generator 30 which generates a luminous flux profile that is supplied to the driver circuit 23. The generated luminous flux profile is selected in accordance with a mode of operation determined as described further below.

Figure 8:
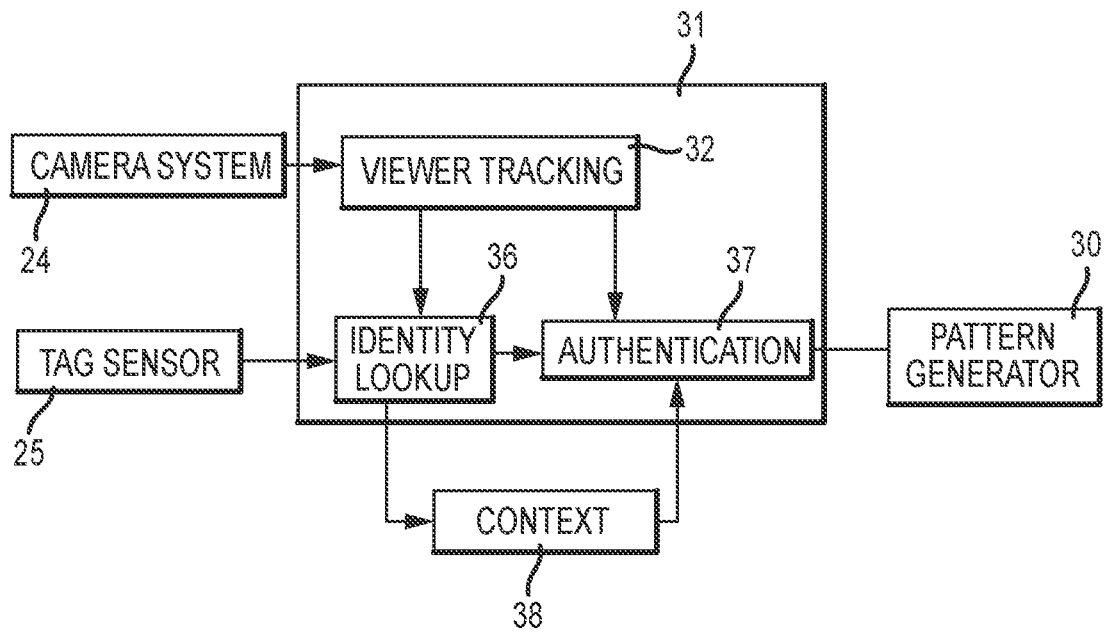
FIG. 8 is a block diagram of an identification module in an example directional display apparatus.

Another functional module of the control circuit 22 is an identification module 31 arranged as shown in FIG. 8.

The identification module 31 includes a viewer tracking module 32 arranged as shown in FIG. 9. The viewer tracking module 32 is supplied with the output signal from the camera system 24.

The viewer tracking module 32 includes a viewer detection module 33 and a tracking module 34 that are each supplied with the output signal from the camera system 24, as well as data association module 35 that is supplied with outputs from the viewer detection module 33 and the tracking module 34.

The viewer detection module 33 analyzes the image captured by the camera system 24 to detect any viewers in the image. The viewer detection module 33 may use conventional detection algorithms for this purpose, typically detecting faces. In one example, the viewer detection module 33 may perform the detection using Haar feature cascades, for example as disclosed in Viola and Jones, "Rapid object detection using a boosted cascade of simple features", CVPR 2001, which is herein incorporated by reference in its entirety.

The tracking module 34 analyzes the image captured by the camera system 24 to determine the position of viewers in the image. The tracking module 34 may use conventional detection algorithms for this purpose, typically tracking heads. In one example, the tracking module 34 may use the approach of Active Appearance Models to provide the position of the head of the viewer, for example as disclosed in Cootes, Edwards, and Taylor, "Active appearance models", ECCV, 2:484-498, 1998, which is herein incorporated by reference in its entirety.

Tracking of a viewer may be stopped if the viewer leaves the field of view of the camera system 24, or becomes occluded for a given time span, or fails to be tracked for a given time span.

The data association module 35 associates the viewers detected by the viewer detection module 33 with the viewers tracked by the tracking module 34. The data association module 35 may start a tracking process for each viewer detected by the viewer detection module 33 that is not a false positive, and that does not overlap more than a given threshold with the currently tracked viewers. In this sense, a false positive is defined as a detection which has not been detected in at least a certain percentage of frames.

In one example of the operation of the data association module 35, only a single viewer treated as the primary viewer is tracked. Detections of viewers from the viewer detection module 33 are assigned a position, and assigned the same identifier as previously detected observations of a viewer having sufficient spatial overlap. In this example, the viewer tracking module 32 stores a history of past appearances of a viewer and uses this as a robustness measure in deciding whether to remove a viewer from the list of tracked viewers. In respect of each previously tracked viewer, if the viewer is not successfully tracked in the current frame or if there is not enough overlap of this viewer's most recent bounding box with any current detection, a count of untracked frames for this viewer is incremented. If the count of untracked frames is greater than a certain threshold, this viewer is removed from list of tracked viewers. Otherwise, the tracking module 34 is supplied the current detection position from the viewer detection module 33 and tracks the viewer who is in that position.

In another example of the operation of the data association module 35, all viewers are tracked, including a primary viewer and secondary viewers. This example may use a Joint Probabilistic Data Association Filter (JPDAF) to predict which detection to assign to which viewer, for example as disclosed in Bar-Shalom and Li "Multitarget-Multisensor Tracking: Principles and Techniques" 1995, which is herein incorporated by reference in its entirety.

The identification module 31 also includes an identity lookup module 36 and an authentication module 37. The viewer tracking module 32 supplies a first output to the identity lookup module 36 that includes, for each viewer detected by the viewer detection module 33 (if any), a unique identifier and image information derived from the captured image. The viewer tracking module 32 also supplies a second output to the authentication module 37 that includes, for each viewer detected by the viewer detection module 33 (if any), a unique identifier and the position of viewer detected by the tracking module 34.

The identity lookup module 36 receives the first output from the viewer tracking module 32 and the output signal from the tag sensor 25 (or alternatively just one of those). On the basis of these signals, identity lookup module 36 attempts to identify any viewers and derives viewer permission information in respect of successfully identified viewers.

The identity lookup module 36 uses a database storing viewer permission information related to individual viewers. This may be related to image information for the viewers and to identifiers for the viewers. The database may be local to the directional display apparatus 20, for example stored in a memory thereof, or may be remote, in which case it can be accessed via a network connection.

The identity lookup module 36 may use the first output from the viewer tracking module 32 that includes image information derived from the captured image by comparing that derived image information with the image information in the database. This comparison may use conventional image comparison techniques. In the event of a match, the viewer permission information associated with the matching image information in the database is retrieved.

The identity lookup module 36 may use the output signal from the tag sensor 25 that includes an identifier (i.e. the determined identity) of each detected viewer derived from the detected tag by comparing the derived identifier with identifiers in the database, In the event of a match, the viewer permission information associated with the matching identifier in the database is retrieved.

Where the identity lookup module 36 uses both the first output from the viewer tracking module 32 and the output signal from the tag sensor 25, the information from each technique is combined to provide a union of the viewer permission information provided by each technique. Alternatively only one of the techniques may be used to provide viewer permission information.

In either case, where the viewer is on the database, then the viewer is identified and the identities of the viewers and their viewer permission information is retrieved and supplied to the authentication module 37.

The identities of the viewers and their viewer permission information are also supplied to a context module 38 that is arranged as shown in FIG. 10. The context module 38 determines whether the viewers are permitted to view the displayed image according to an authentication rule in an authentication rule look-up module 39. This may be implemented by assigning a label to each viewer. A viewer is defined to the system by position and extent in an image, as well as the actual source image.

The authentication rule may take account of the viewer permission information of the viewers, as determined by the identity lookup module 36. The authentication rule may also take account of other information. Generally speaking, the authentication rule may take account of any information that is available, thus providing significant power in the authentication process. Some non-limitative examples of the authentication rule that may be implemented in the context module 38 are as follows. These and other examples may be used individually, or in any combination.

The authentication rule may also take account of the viewer permission information in various alternative ways.

In one simple example, the viewer permission information may specify that given viewers are authorized or not. In that case, the authentication rule may be to permit viewing in respect of viewers who are both present in the database and authorized (i.e. a "white list", wherein unknown viewers are forbidden from viewing). Alternatively, the authentication rule may be to permit viewing in respect of viewers unless they are present in the database and not authorized (i.e. a "black list", wherein unknown viewers are permitted to view).

The authentication rule may be to permit individuals to view or not on the basis of only of their own viewer permission information, i.e. applying the viewer permission information on an individual basis. Alternatively, the viewer permission information may take account of the set of viewers who are present, i.e. applying the viewer permission information on a group basis. For example, the viewer permission information for one individual may provide (or forbid) permission for all viewers present, in which case the authentication rule may be to permit (or forbid) viewing by all viewers present on the basis of the presence of an individual having such viewer permission information. By way of example, this may allow a senior individual in an organization to authorize viewing by others.

The viewer permission information may indicate relationships between the viewers. In that case, the authentication rule may take account of those indicated relationships. For example where the primary viewer who is first observed by the viewer tracking module 32 is permitted to view an image, then the authentication rule may be to permit viewing by secondary viewers who are observed later, if they have a predetermined relationship with the primary viewer. By way of example, this may allow teams in an organization to view together.

As an alternative, the authentication rule may provide set permissions on the basis of the order in which the viewers are observed by the viewer tracking module 32. This may occur without reference to the viewer permission information, or in combination with the viewer permission information. In one example, the primary viewer who is first observed by the viewer tracking module 32 may be permitted to view an image and secondary viewers who are subsequently observed by the viewer tracking module 32 may be not be permitted to view an image, irrespective of their identity. In another example, the primary viewer who is first observed by the viewer tracking module 32 may be permitted to view an image and secondary viewers who are subsequently observed by the viewer tracking module 32 may be permitted or not on the basis of their viewer permission information.

The authentication rule may take account of image information concerning the viewers that is derived from the image capture by the capture system 24. For example, the width of the faces of any viewers may be determined as indicating the distance of the viewers from the directional display device 1.

In one example, the authentication rule may allow or forbid viewing in dependence on the determined width of the faces of the viewers, for example only permitting viewers for whom the width is above a threshold taken to indicate that the viewers are close to the directional display device 1.

In another example, a primary viewer who is first observed by the viewer tracking module 32 is permitted to view an image irrespective of the output of the identity lookup module 36 and secondary viewers who are subsequently observed by the viewer tracking module 32 are not permitted. If the primary observer ceases to be observed, but later a viewer reappears in similar location and having a similar width, then the reappearing viewer is permitted viewing, i.e. on the assumption that it is likely to be the same individual. However, after a predetermined timeout after the primary observer ceases to be observed, the authentication rule is reset such that the next viewer who is observed is taken as the primary viewer.

The context module 38 may also be supplied with any or all of output signals from the camera system 24, output signals from the location sensor 27 and the list 29 of system processes, which may be applied in the authentication rule.

In some examples, the authentication rule may decide whether viewers are permitted viewing in dependence on information about the location of the directional display device 1. The authentication rule may take account of the location alone, for example permitting or forbidding viewing in particular locations, or in combination with the viewer permission information, for example by the viewer permission information being location-specific.

In one type of example using location, the information about the location of the directional display device 1 may be the geographical location of the directional display device 1 represented by the output signal from the location sensor 27.

In another type of example, the information about the location of the directional display device 1 may be derived from the image captured by the camera system 24 in a location identification module 40. Any suitable image analysis technique that provides information about the scene of the captured image may be applied. For example, the captured image may be classified using a suitably trained image classification system, e.g. as disclosed in Karen Simonyan & Andrew Zisserman, "Very Deep Convolutional Networks For Large-Scale Image Recognition", ICLR 2015, which is herein incorporated by reference in its entirety, or using Bag-of-Words indexing of suitable sparse features. The output may be a label describing the environment in the location of the directional display device 1. Such techniques may for example indicate the location as being in a car, in a domestic home, or a workplace, etc.

In some examples, the authentication rule may decide whether viewers are permitted viewing in dependence on the list 29 of system processes. For example, the label assigned to the viewers can be adjusted according to the use case of the directional display device, including the software being executed and/or the nature of the image being viewed. In one example, where the image is deemed to be non-sensitive for example a film, all viewers may be permitted viewing. This may be used without reference to the viewer permission information, or in combination with the viewer permission information. In one example, the viewer permission information may be specific to certain software is being executed.

The authentication rule may take account of the time and/or date.

The output of the context module 38 that indicates whether the viewers are permitted to view the displayed image is supplied to the authentication module 37 of the identification module 31.

The authentication module 37 uses the second output of the viewer tracking module 32 that includes, for each viewer detected by the viewer detection module 33 (if any), a unique identifier and the position of viewer detected by the tracking module 34, together with the output of the context module 38, to decide whether viewers are permitted to view the displayed image. On the basis of that decision, the authentication module 37 sets the mode of operation causing selection of the luminous flux profile.

The authentication module 37 may perform this operation of setting the mode of operation in accordance with the flow chart shown in FIG. 11, which is now described. In this operation, the viewing window is adjusted by varying its width.

In step S1, a default mode of operation is set. This may be the wide angle mode, for example as shown in FIG. 3, or a blank mode in which no image is displayed.

In step S2, the first viewer to be observed, as identified by the second output of the viewer tracking module 32, is detected and assigned as the primary viewer.

In step S3, it is determined whether the primary viewer is permitted viewing of the displayed image, as indicated by the output of the context module 38. If not, then in step S4, the blank mode is set, and the method pauses until the primary viewer ceases to be observed, after which the method reverts to step S2.

As an alternative step S3 may be replaced by a step of setting the wide angle mode (if that is not already the default mode) and the method continues to step S6 described below. In this alternative, the primary viewer is always permitted to view the displayed image.

If it is determined in step S3 that the primary viewer is permitted viewing, then in step S5, the wide angle mode is set, if it has not already been set in step S1. Thus, at this stage the wide angle mode is used, providing a wide viewing angle.

In step S6, any further viewers to be observed, as identified by the second output of the viewer tracking module 32, are detected and assigned as secondary viewers.

In step S7, it is determined whether the secondary viewer assigned in step S6 is permitted viewing of the displayed image, as indicated by the output of the context module 38. If not, then in step S4, the privacy mode is set. In this example which involves adjustment by changing the width of the viewing mode, the width of the viewing window is decreased in the privacy mode set in step S8, for example as shown in FIG. 4, compared to the wide angle mode set in step S5 (or step S1). As a result, the visibility of the image to the secondary viewer is reduced.

If it is determined in step S7 that the secondary viewer is permitted viewing, then the method reverts to step S6 to detect any further secondary viewers. If further secondary viewers are detected, then the method repeats step S7 in case the additional secondary viewer affects the decision whether to permit viewing.

The authentication module 37 provides an output indicating the set mode of operation to the pattern generator 30 as the basis for generating the luminous flux profile that is supplied to the driver circuit 23. As well as selecting between luminous flux profiles in the wide angle mode and the privacy mode, the pattern generator selects other aspects the luminous flux profile as follows.

The pattern generator 30 is supplied with the second output of viewer tracking module 32, via the authentication module 37. In the privacy mode, the pattern generator 30 shifts the luminous flux profile, for example as shown in FIG. 6, to track the position of the primary viewer, as indicated by the second output of viewer tracking module 32. In the wide angle mode, as all the light sources 4 are operated as shown in FIG. 3, the viewing window need not, and indeed cannot, be so shifted.

Figure 12:
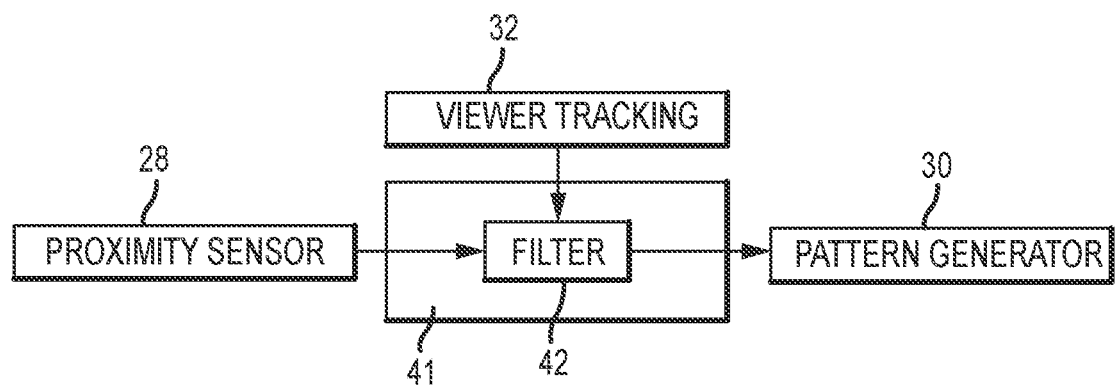
FIG. 12 is a block diagram of a proximity module in an example directional display apparatus.

Another functional module of the control circuit 22 is a proximity module 41 arranged as shown in FIG. 12 including a signal filter 42. The signal filter 42 of the proximity module 41 is supplied with the output signal from the proximity sensor 28 and the second output of the viewer tracking module 32, for each detected viewer, a unique identifier and the position of viewer detected by the tracking module 34. The signal filter 42 filters these signals to generate parameters that are supplied to the pattern generator 30.

The parameters may include a depth estimate of the primary viewer derived from the output of the proximity sensor 28. In one example, where only the output signal of the proximity sensor 28 is used and the proximity sensor 28 yields a single depth value, the signal filter 42 includes a low-pass filter which removes high-frequency noise, e.g. due to noise in the proximity sensor 28, to derive the depth estimate. Such a depth estimate may alternatively be derived from the second output of the viewer tracking module 32.

The pattern generator 30 controls the luminous flux profile in accordance with the parameters supplied from the proximity module 41. For example, in the case that the parameters include a depth estimate of the primary viewer, the width of the luminous flux profile may be adjusted in accordance with the depth estimate, typically to widen the viewing window with increasing proximity of the primary viewer.

Figure 13:
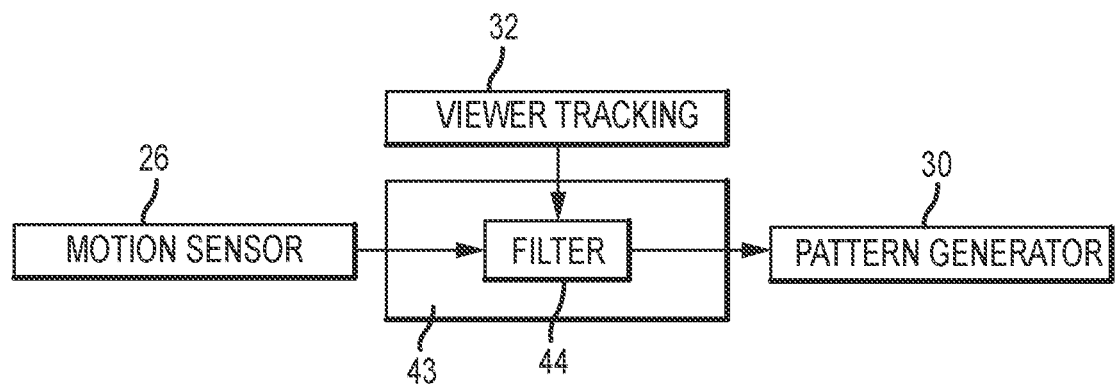
FIG. 13 is a block diagram of a motion sensing module in an example directional display apparatus.

Another functional module of the control circuit 22 is a motion sensing module 43 arranged as shown in FIG. 13 including a signal filter 44. The signal filter 44 of the motion sensing module 43 is supplied with the output signal from the motion sensor 28 and the second output of the tracking module 32, for each detected viewer, a unique identifier and the position of viewer detected by the tracking module 34. The signal filter 44 filters these signals to generate parameters that are supplied to the pattern generator 30.

The parameters may include a parameter representing relative movement between the primary viewer and the directional display device 1.

The parameter may be derived from the output signal of the motion sensor 26. As this represents the detected motion of the directional display apparatus, it effectively represents relative movement between the primary viewer and the directional display device 1.

Additionally or instead, the parameter may be derived from the second output of the tracking module 32. As this indicates the position of the viewers determined from analysis of the image captured by the camera system 24, change in the position derived by the output of the filter represents relative movement between the primary viewer and the directional display device 1.

The relative movement represented by the parameter may include a linear motion of the viewer relative to the directional display device 1 laterally of the viewing window. By way of example, the parameter may represent the velocity of this motion.

Additionally or instead, the relative movement represented by the parameter may include vibratory movement of the directional display device 1 relative to the viewer. By way of example, the parameter may represent a covariance, for example a covariance matrix, of the velocity of movement. In one example where the output signal of the motion sensor 28 is used and where output signal of the motion sensor 28 represents acceleration, the signal filter 44 may be a high-pass filter which removes low-frequency noise, e.g. due to slow velocity changes.

The pattern generator 30 controls the luminous flux profile in accordance with the parameters supplied from the motion sensing module 43. In particular, in the privacy mode, the width of the luminous flux profile is increased in response to the parameters indicating detection of relative movement between the primary viewer and the directional display device 1. The width may be increased as described above, for example by changing from the first luminous flux profile of FIG. 5 to the second luminous flux profile of FIG. 6. In the wide angle mode, as all the light sources 4 are operated, the viewing window need not, and indeed cannot, be so widened.

Thus, the above example relates to a case where the position and width of the viewing window are variable, wherein the position of the viewing window is controlled to track the determined position of the viewer, and wherein the viewing window is adjusted in response to detecting the presence of one or more secondary viewers by reducing the width of the viewing window (in step S8). However, various modifications are possible. Some non-limitative examples of possible modifications are as follows.

A first possible modification is that only the width of the viewing windows is variable, not the position of the viewing windows. In that case, the position of the viewing window is not controlled to track the determined position of the viewer, but the viewing window may still be adjusted in response to detecting the presence of one or more secondary viewers by decreasing the width of the viewing window.

A second possible modification is that the viewing window may be adjusted in response to detecting the presence of one or more secondary viewers by shifting the position of the viewing window away from the secondary viewer, instead of decreasing the width of the viewing window. This may be achieved by modifying the operation in accordance with the flow chart shown in FIG. 11 as follows.

Firstly, step S5 is modified so that, instead of wide angle mode being set, the first luminous flux profile of the privacy mode is set, for example as shown in FIG. 4.

Secondly, step S8 is modified so that the first luminous flux profile of the privacy mode is set but with a shifted position, so that the position of the viewing window is shifted away from the position of the secondary viewer, as determined by the viewer tracking module 32. This adjustment may be made without changing the width of the viewing window (although optionally the width of the viewing window could additionally be decreased). The shift of position is chosen so that the image is still visible to the primary viewer. However, by shifting the viewing window away from the secondary viewer the visibility of the image to the secondary viewer is reduced.

In this second modification, the position of the viewing window may continue to be controlled to track the determined position of the viewer, as described above.

Also incorporated by reference herein in their entireties are U.S. Patent Publ. No. 2013/0321599, U.S. Patent Publ. No. 2015/0378085, and U.S. patent application Ser. No. 15/165,960.

While various embodiments in accordance with the principles disclosed herein have been described above, it should be understood that they have been presented by way of example only, and not limitation. Thus, the breadth and scope of this disclosure should not be limited by any of the above-described exemplary embodiments, but should be defined only in accordance with any claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 CFR 1.77 or otherwise to provide organizational cues. These headings shall not limit or characterize the embodiment(s) set out in any claims that may issue from this disclosure. Specifically and by way of example, although the headings refer to a "Technical Field," the claims should not be limited by the language chosen under this heading to describe the so-called field. Further, a description of a technology in the "Background" is not to be construed as an admission that certain technology is prior art to any embodiment(s) in this disclosure. Neither is the "Summary" to be considered as a characterization of the embodiment(s) set forth in issued claims. Furthermore, any reference in this disclosure to "invention" in the singular should not be used to argue that there is only a single point of novelty in this disclosure. Multiple embodiments may be set forth according to the limitations of the multiple claims issuing from this disclosure, and such claims accordingly define the embodiment(s), and their equivalents, that are protected thereby. In all instances, the scope of such claims shall be considered on their own merits in light of this disclosure, but should not be constrained by the headings set forth herein.

The invention claimed is:

1. A privacy control method of controlling a directional display device that is capable of directing a displayed image into a viewing window that is adjustable, the method comprising:
    directing the displayed image into a viewing window that is adjustable;
    capturing a viewing region image;
    analyzing the viewing region image to detect the presence of one or more secondary viewers in addition to a primary viewer;
    in the event of detecting the presence of the one or more secondary viewers:
        deriving image information of the one or more secondary viewers detected in the viewing region image,
        deciding whether the one or more secondary viewers is permitted to view the displayed image in dependence on what application software system processes are being performed and in dependence on (ii) a comparison of derived image information with a database that associates image information of viewers with viewer permission information; and
    adjusting the viewing window in response to detecting the presence of one or more secondary viewers and deciding that the one or more secondary viewers is not permitted to view the displayed image.

2. A privacy control method according to claim 1, wherein the step of detecting the presence of one or more secondary viewers in addition to the primary viewer comprises detecting an electromagnetic tag carried by the one or more secondary viewers.

3. A privacy control method according to claim 1, wherein the directional display device is capable of directing the displayed image into a viewing window of variable width, and
    said adjusting of the viewing window comprises decreasing the width of the viewing window.

4. A privacy control method according to claim 3, wherein the directional display device is capable of directing the displayed image into a viewing window of variable position and width,
    the method further comprises capturing a viewing region image, analyzing the viewing region image to determine the position of the primary viewer, and
    in said step of directing a displayed image into a viewing window, at least when the width of the viewing window is decreased, the viewing window has a position that tracks the determined position of the primary viewer.

5. A privacy control method according to claim 1, wherein the directional display device is capable of directing the displayed image into a viewing window of variable position, and
    said adjusting of the viewing window comprises shifting the position of the viewing window away from the secondary viewer.

6. A privacy control method according to claim 5, wherein the method further comprises capturing a viewing region image, analyzing the viewing region image to determine the position of the primary viewer and the secondary viewer, and
    in said step of directing a displayed image into a viewing window, the viewing window has a position that tracks the determined position of the primary viewer.

7. A privacy control method according to claim 1, wherein the directing of the displayed image comprises directing light from a directional backlight through a transmissive spatial light modulator and into a viewing window, the modulator being capable of displaying the displayed image.

8. A privacy control method according to claim 7, wherein the directing of the displayed image further comprises directing light emitted by an array of light sources of the directional backlight to a waveguide arranged to direct light from the light sources into respective optical windows, said viewing window comprising at least one optical window.

9. A directional display apparatus having a privacy control function, the apparatus comprising:
a directional display device that is capable of directing a displayed image into a viewing window that is adjustable;
a camera system arranged to capture a viewing region image;
a control system for controlling the directional display device, wherein the control system is arranged to detect the presence of one or more secondary viewers in addition to a primary viewer by analyzing the viewing region image to detect the one or more secondary viewers in the viewing region image, and, in the event of detecting the presence of the one or more secondary viewers:
to derive image information of the one or more secondary viewers detected in the viewing region image, and
to decide whether the one or more secondary viewers is permitted to view the displayed image in dependence on:
(i) what application software system processes are being performed by the control system; and
(ii) a comparison of derived image information with a database that associates image information of viewers with viewer permission information;
wherein the control system is arranged to control the directional display device to direct a displayed image into a viewing window that is adjusted in dependence on the decision whether the one or more secondary viewers is permitted to view the displayed image.

10. A directional display apparatus according to claim 9, wherein
the directional display apparatus further comprises a tag sensor arranged to detect electromagnetic tags, and
the control system is arranged to detect the presence of one or more secondary viewers in addition to the primary viewer on the basis of the output of the tag sensor.

11. A directional display apparatus according to claim 9, wherein
the directional display device is capable of directing the displayed image into a viewing window of variable width, and
the control system is arranged to control the directional display device to adjust the viewing window by decreasing the width of the viewing window.

12. A directional display apparatus according to claim 11, wherein
the directional display device is capable of directing the displayed image into a viewing window of variable position and width,
the directional display apparatus further comprises a camera system arranged to capture a viewing region image,
the control system is arranged to analyze the viewing region image to determine the position of the primary viewer, and
the control system is arranged to control the directional display device to direct a displayed image into a viewing window whose width is decreased in dependence on detection of the presence of the one or more secondary viewers, and whose position, at least when the width of the viewing window is decreased, tracks the determined position of the primary viewer.

13. A directional display apparatus according to claim 9, wherein
the directional display device is capable of directing the displayed image into a viewing window of variable position, and
the control system is arranged to control the directional display device to adjust the viewing window by shifting the position of the viewing window away from the secondary viewer.

14. A directional display apparatus according to claim 13, wherein
the control system is arranged to analyze the viewing region image to determine the position of the primary viewer and the secondary viewer, and
the control system is arranged to control the directional display device to direct a displayed image into a viewing window whose position tracks the determined position of the primary viewer, while shifting the position of the viewing window away from the secondary viewer.

15. A directional display apparatus according to claim 9, further comprising:
a transmissive spatial light modulator capable of displaying a displayed image; and
a directional backlight capable of directing light through the spatial light modulator into said viewing window.

16. A directional display apparatus according to claim 15, wherein the directional backlight comprises:
an array of light sources; and
a waveguide arranged to direct light from the light sources into respective optical windows, said viewing window comprising at least one optical window.

* * * * *